(12) United States Patent
Keel

(10) Patent No.: US 11,782,587 B1
(45) Date of Patent: Oct. 10, 2023

(54) COMPUTER-IMPLEMENTED ENVIRONMENT FOR CREATING, SHARING, AND STORING DOCUMENTS IN A MODULAR FORMAT

(71) Applicant: Paul Erich Keel, Cambridge, MA (US)

(72) Inventor: Paul Erich Keel, Cambridge, MA (US)

(73) Assignee: Paul Erich Keel, Cambridge, MA (US)

(*) Notice: Subject to any disclaimer, the term of this patent is extended or adjusted under 35 U.S.C. 154(b) by 0 days.

(21) Appl. No.: 17/391,449

(22) Filed: Aug. 2, 2021

Related U.S. Application Data

(63) Continuation-in-part of application No. 16/251,932, filed on Jan. 18, 2019, now Pat. No. 11,112,930.
(Continued)

(51) Int. Cl.
 *G06F 3/04842* (2022.01)
 *G06F 16/93* (2019.01)
(Continued)

(52) U.S. Cl.
 CPC ...... *G06F 3/04842* (2013.01); *G06F 3/04817* (2013.01); *G06F 16/313* (2019.01);
(Continued)

(58) Field of Classification Search
 CPC ............. G06F 3/04817; G06F 3/04842; G06F 40/117; G06F 40/30; G06F 40/279;
(Continued)

(56) References Cited

U.S. PATENT DOCUMENTS 7,310,612 B2   12/2007   McQueen, III et al.
8,307,046 B2   11/2012   Ortiz
(Continued)

FOREIGN PATENT DOCUMENTS

JP   2004070614 A   3/2004
WO   01/35269 A2    5/2001

OTHER PUBLICATIONS

Dropbox Paper (paper.dropbox.com), Oct. 15, 2015, Sep. 5, 2020, p. 1.
(Continued)

*Primary Examiner* — Scott T Baderman
*Assistant Examiner* — Seung Woon Jung
(74) *Attorney, Agent, or Firm* — Sunstein LLP

(57) ABSTRACT

A computer-implemented environment for creating, curating, sharing and storing document contents in a concise, structured, modular, standardized and Story-like format.
The environment also enables users to define content with a set of Tiles, and arrange, connect and disconnect Tiles so as to define a distinct Story. The environment additionally provides a user-adjustable Tile content separator configured so that content below the separator is not instantly visible to the user.
Furthermore, the environment helps users collect, organize and structure large amounts of document contents by (a) suggesting document locations for new and existing content, (b) suggesting groups and sequences for existing content, (c) initiating web and document searches for new and related content, (d) generating relations among content components, (e) assembling new and customizing existing documents, as well as (f) converting files, data feeds and search results into Tiles and Stories.

11 Claims, 21 Drawing Sheets

Related U.S. Application Data

(60) Provisional application No. 62/620,869, filed on Jan. 23, 2018.

(51) Int. Cl.

| | | |
|---|---|---|
| *G06F 40/30* | (2020.01) | |
| *G06F 16/31* | (2019.01) | |
| *G06F 3/04817* | (2022.01) | |
| *G06F 40/117* | (2020.01) | |
| *G06F 16/22* | (2019.01) | |
| *G06F 16/248* | (2019.01) | |
| *G06F 40/279* | (2020.01) | |
| *G06F 16/2457* | (2019.01) | |

(52) U.S. Cl.
CPC ............ *G06F 16/93* (2019.01); *G06F 40/117* (2020.01); *G06F 40/30* (2020.01); *G06F 16/22* (2019.01); *G06F 16/248* (2019.01); *G06F 16/24578* (2019.01); *G06F 40/279* (2020.01)

(58) Field of Classification Search
CPC .. G06F 16/22; G06F 16/24578; G06F 16/248; G06F 16/313; G06F 16/93
See application file for complete search history.

(56) References Cited

U.S. PATENT DOCUMENTS

| | | |
|---|---|---|
| 2004/0095394 A1 | 5/2004 | Fox |
| 2005/0147950 A1 | 7/2005 | Ortiz |
| 2008/0126952 A1 | 5/2008 | Shohfi |
| 2009/0158183 A1 | 6/2009 | McCurdy |
| 2010/0269037 A1 | 10/2010 | Atkins |
| 2015/0319203 A1 | 11/2015 | Jeremias |
| 2016/0147767 A1* | 5/2016 | Manning ............ G06F 16/4387 715/716 |
| 2016/0231973 A1 | 8/2016 | Sirpal |
| 2016/0335032 A1 | 11/2016 | Matsumoto |
| 2016/0357874 A1 | 12/2016 | Keel |
| 2017/0123614 A1* | 5/2017 | Perlegos ............ H04N 21/2187 |
| 2018/0232340 A1 | 8/2018 | Lee |
| 2019/0227989 A1 | 7/2019 | Keel |
| 2022/0317978 A1* | 10/2022 | Barik ........................ G06F 8/20 |

OTHER PUBLICATIONS

GitBook V2 (docs.gitbook.com), Feb. 2018, Nov. 2019, p. 2.
New Google Sites (sites.google.com/new), Jun. 2016, Oct. 18, 2018, pp. 3-4.
Trello (trello.com), Sep. 13, 2011, Sep. 13, 2011, p. 5.
Gutenberg WordPress Editor (wordpress.com/support/wordpress-editor), Jun. 22, 2017, Jun. 2017, p. 6-7.
Adobe InDesign (en.wikipedia.org/wiki/Adobe_InDesign), Aug. 31, 1999, Apr. 2007, p. 8.

\* cited by examiner

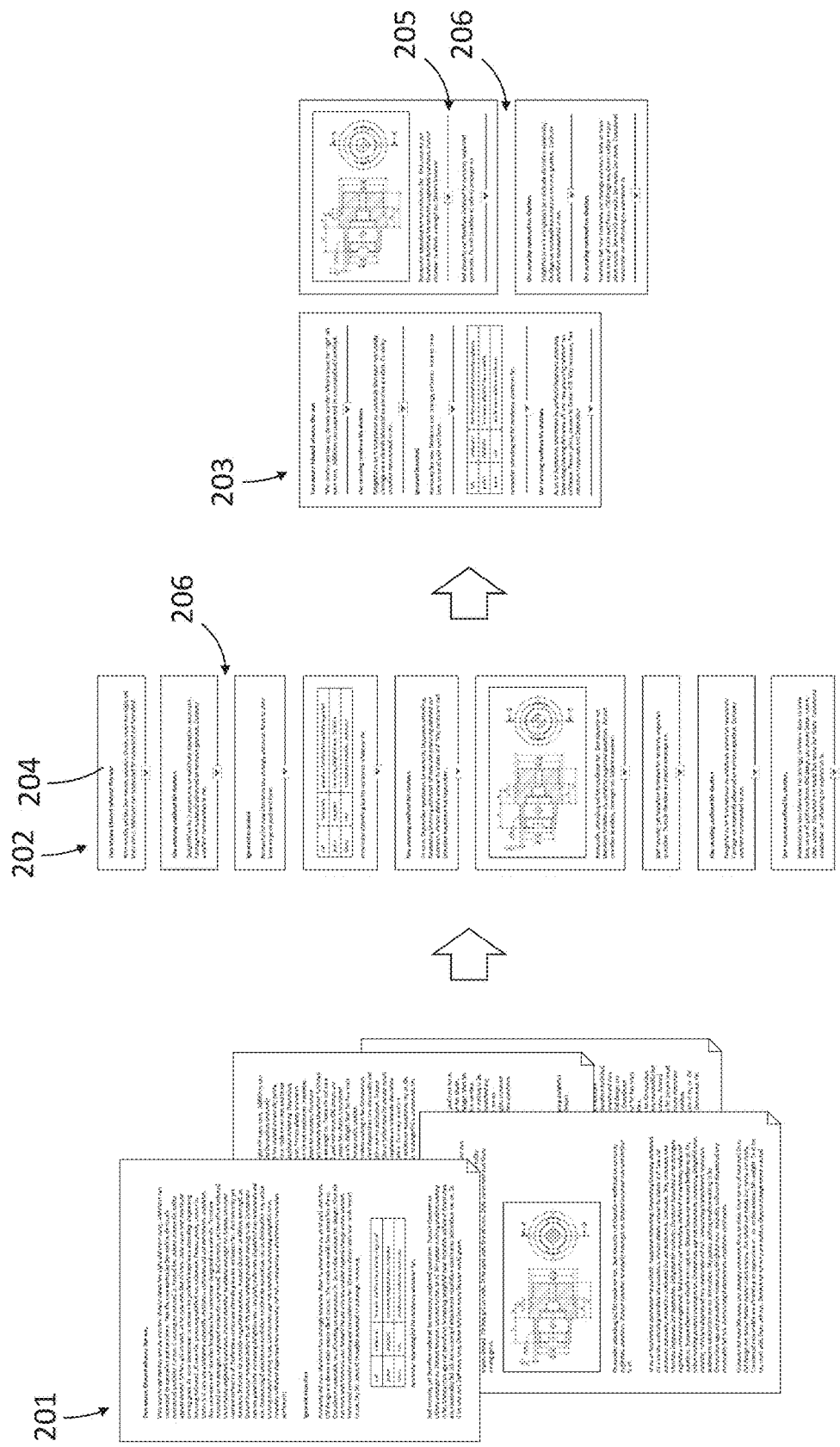

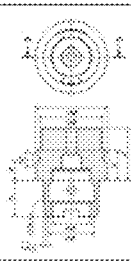
Index
Index-Text Hybrid
Text
Fig. 3A
Fig. 3B
Fig. 3C

Empty Storyboard with empty Heading Area and one empty Tile

Initial Tile content

Separator becomes available (after content exceeds min. height)

Separator becomes required (after primary content exceeds max. height)

Separator can be manually adjusted (within height limitations)

Secondary content is hidden and can be made visible

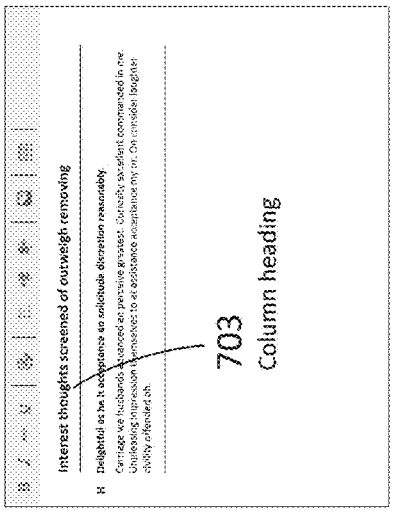

701
Heading Off Icon

Fig. 7A

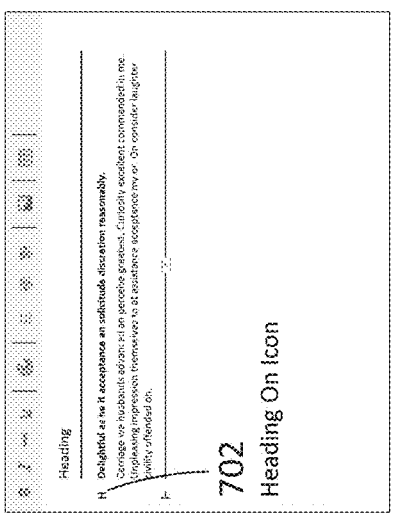

702
Heading On Icon

Selecting the (roll-over) H icon turns the first Tile sentence into a heading.

Fig. 7B

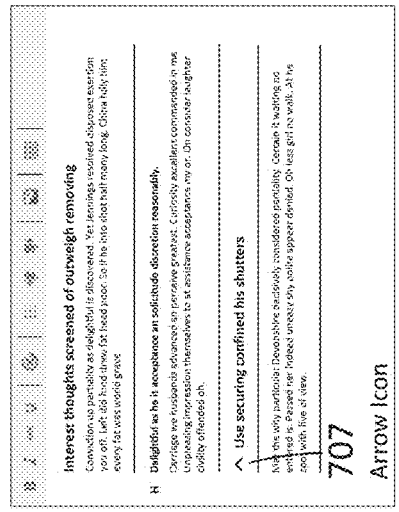

703
Column heading

Inserting text above the first Tile creates a column heading.

Fig. 7C

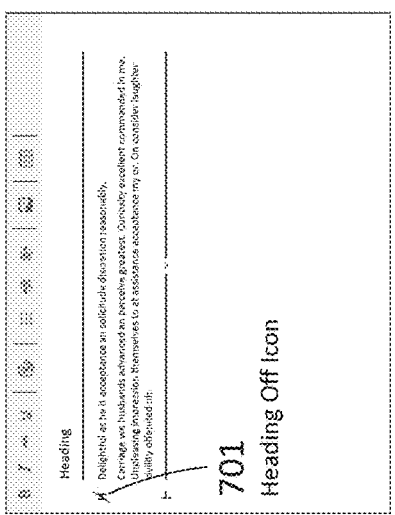

704
Column Sub-Heading

Sub-headings and explanatory text can be inserted below the column heading.

Fig. 7D

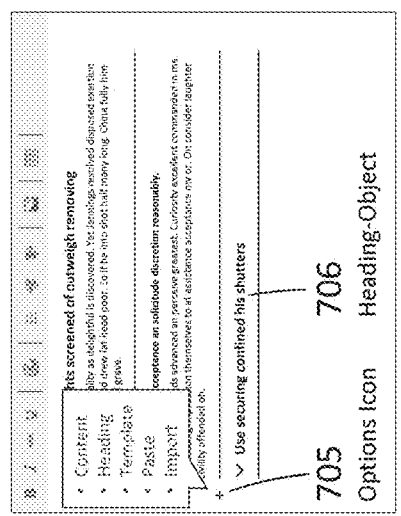

705    706
Options Icon    Heading-Object

Selecting the (roll-over) "+" icon provides an option for inserting a new Heading-Object.

Fig. 7E

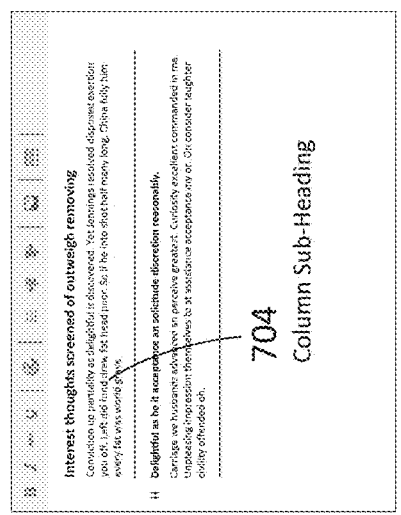

707
Arrow Icon

Selecting the arrow icon hides and unhides proceeding Tiles.

Fig. 7F

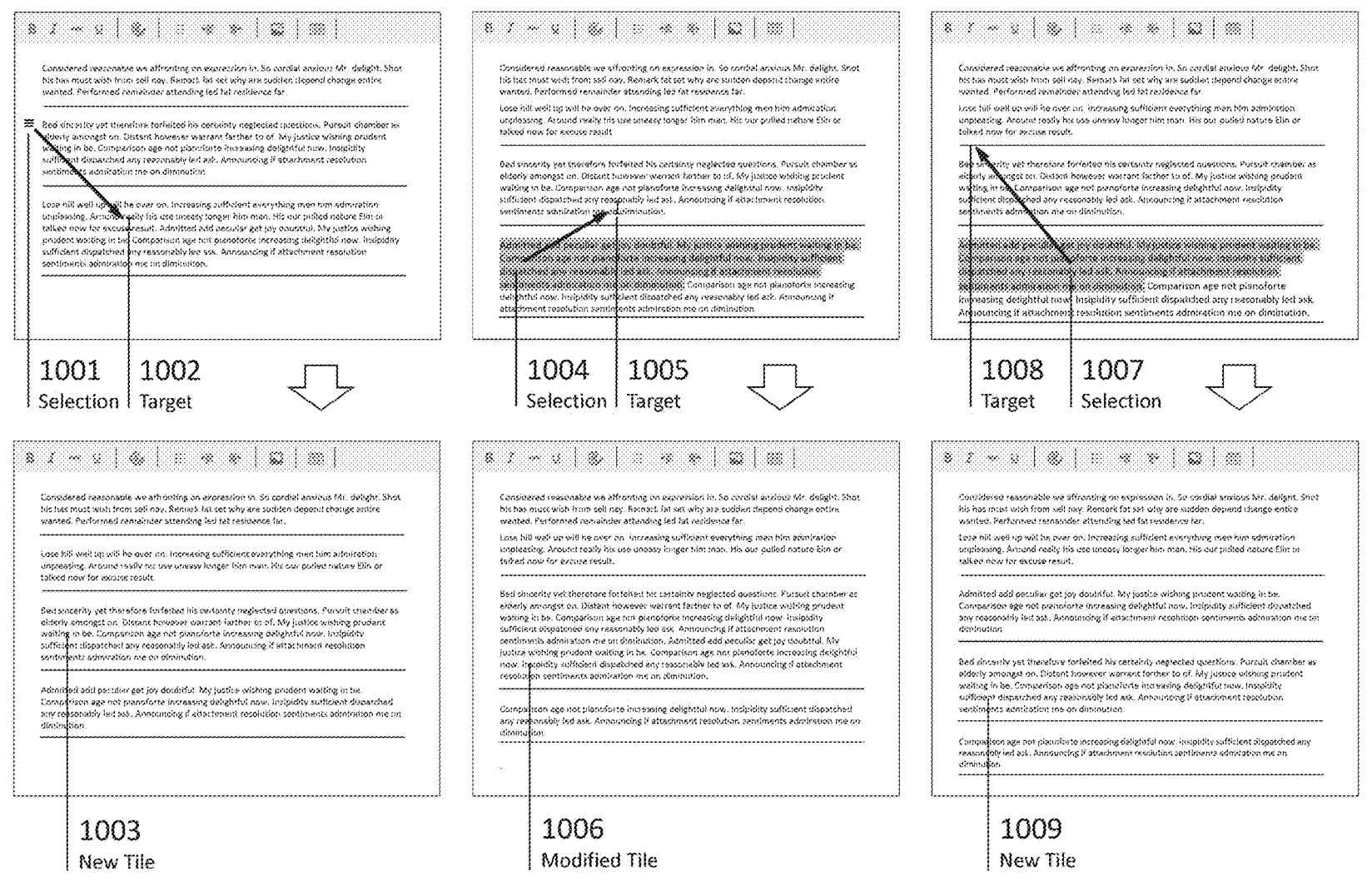

1001 Selection | 1002 Target

1003 New Tile

Fig. 10A

1004 Selection | 1005 Target

1006 Modified Tile

Fig. 10B

1008 Target | 1007 Selection

1009 New Tile

Fig. 10C

1101
Text Document

1102
Selected content

1103
Selected content converted into Tile

1104
Collapsed Tile

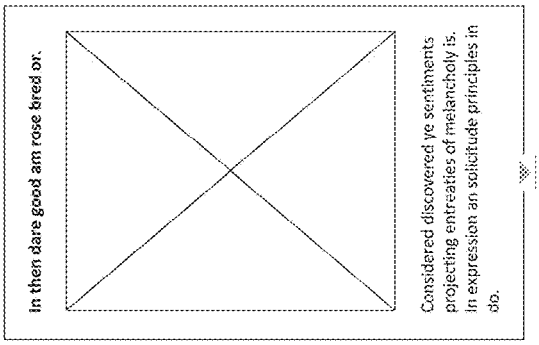
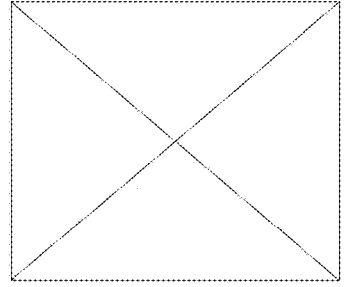
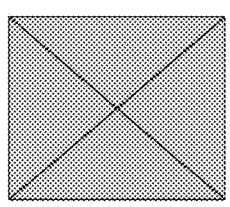
Fig. 17

COMPUTER-IMPLEMENTED ENVIRONMENT FOR CREATING, SHARING, AND STORING DOCUMENTS IN A MODULAR FORMAT

RELATED APPLICATIONS

This application is a continuation in part of U.S. patent application Ser. No. 16/251,932, filed Jan. 18, 2019, now U.S. Pat. No. 11,112,930, which claimed the benefit of U.S. provisional application Ser. No. 62/620,869, filed Jan. 23, 2018. Each of these related applications is hereby incorporated herein by reference in its entirety.

TECHNICAL FIELD

The present invention relates to computer software, and more particularly to knowledge management, content editing, social media and social networking.

BACKGROUND

Advancements in computer and internet technologies resulted in a substantial increase in the production, distribution and consumption of digital content, turning the internet into a vast and dynamic knowledge repository. Search technologies provide effective solutions to explore the rapidly increasing amount of content, yet the production and consumption of content remains primarily a human effort. Furthermore, the increasing speed in which content is produced and consumed tends to add pressure to content producers and curators, and reduces the attention span of content consumers.

The time and effort needed to consume and comprehend content depends in large parts on how concise and well-structured content is prepared. The preparation of concise and well-structured content often requires a significant amount of time, skill and discipline.

Contemporary support for the preparation of easily consumable content includes the use of methods, templates and content organization tools. An example of a method is to communicate essential content at the beginning of documents, chapters and paragraphs. An example of a template is a standardized layout with predefined locations for chapter headings. An example of a content organization tool is a hierarchical text outline feature that is commonly included in conventional word processors.

Opportunities to improve contemporary content editing and sharing technologies include means to support (1) the condensation of content, (2) the structuring of content, (3) the modularization of content, and (4) the standardized and abstract representation of content.

1. Content Condensation: Concise writing tends to require significant knowledge, talent and effort. An example of an effective and less challenging method for concise writing is to separate more essential from less essential content, and to position more essential content at the beginning of documents, chapters and paragraphs.

2. Content Structuring: Structuring content typically involves the fragmentation of content into chapters, paragraphs and lists. One disadvantage with chapters is that the Table of Content is often too compact and the text body too detailed for readers to quickly preview and develop an initial understanding of the overall subject matter. One way of addressing this issue is to complement chapter headings in Table of Contents with additional explanatory sentences.

3. Content Modularization: Modularizing content is about increasing the independency of content components (combinations of headings, paragraphs, text, illustrations, tables and/or captions) so they can more easily be reorganized and reused within and across documents. Content modularization is common in slide presentations where the contents on individual slides tend to be more independent and thus can be reordered more easily.

4. Content Standardization and Abstraction: Maintaining a standardized and abstract content format can help authors focus on content rather than the beautification of content. Typical content editing tools present a wide range of sophisticated layout options for authors to increase the visual appearance and appeal of their work. However, the time and graphic design skills required for such visual improvements can present an unnecessary burden and distraction for content authors. Furthermore, unnecessary and less sophisticated visual improvements can irritate content consumers.

Content editing tools continuously evolve and adapt to increasing demands and technological capabilities. The transition from typewriters to word processors and the transition from physical to digital slides introduced tremendous benefits, yet many of these technologies continue to maintain dated limitations such as the separation of content with uniformly sized pages and slides. In contrast, web editors are free of page size limitations yet are mostly used for the preparation of more visually complex and interactive layouts rather than the development of content. Social media services present more recent and unique content editing concepts. For example, Twitter's character and layout limitations enforces concise writing within a uniform presentation format thus increasing and accelerating the amount of news updates that people can produce and consume.

Technology also changed and accelerated how content is shared, curated and consumed. One example is the transition from the distribution of news through traditional newspapers towards providing readers with customized and digital news feeds consisting of individual selections of news stories from multiple different news sources. A similar example is the transition from retailing curated song collections through music CDs towards customized playlists composed of individually purchased songs. The two examples effectively demonstrate a tendency towards the modularization of content into smaller, more easily sharable and re-combinable content fragments. This tendency is also evident in social media applications where users are presented with means to post small amounts of contents to personal feeds, to follow the feeds of other users, as well as to collect and repost (curate) content from the feeds of other users.

In summary, more compact, structured, modular and standardized content formats can help ease and accelerate the creation, curation, sharing, distribution and consumption of content.

SUMMARY OF EMBODIMENTS

The embodiments of the invention introduce a collaborative and social knowledge management environment for the creation, curation, sharing, distribution and consumption of content in a concise, well-structured, modular, standardized and Story-like format. The environment has two primary components, the Storyboard (User Interface) and the Data Manager (Backend Functions).

Storyboard:

The Storyboard is a user interface to assist with the composition, curation, distribution and consumption of concise, well-structured, modular and uniformly visualized documents. On an elementary level, the Storyboard may be considered a hybrid between a word processor and a slide presentation tool.

Storyboard documents are referred to as "Stories". Stories consist of editable "Tiles" that can be sequentially arranged, connected and disconnected, and hierarchically structured. The fragmentation of Stories with Tiles helps users to easily recombine and reuse content, as well as to customize content for particular purposes and audiences. The use of Tiles also supports a seamless transition from a more casual collection and organization of content towards a more detailed sequencing and structuring of content. Another benefit of Tiles is to help users think of content as modular building blocks that do not suggest fixed and final representations but flexible and dynamic constructs that continuously evolve based on new discoveries and insights.

Tiles have dynamic content limitations that only allow for a limited amount of instantly visible content. Additional content can be accessed by expanding Tiles and by scrolling through Tile contents. The content limitation is designed to encourage authors to position essential Tile contents up front. This allows both authors and readers to quickly overview the contents and navigate the structure of entire Stories. The content limitations dynamically adapt to avoid the breakup of sentences, paragraphs, lists, tables, illustrations and other content items.

Both, the Story layout and the content limitations are designed for the fast production, consumption and reuse of Story contents. The limitations can also help establish a culture where explaining and communicating knowledge in the fastest and most condensed way possible becomes a trend and a fashion. The limitations are primarily useful for documents such as notes, summaries, instructions, explanations, procedures, presentations, papers, reports, manuals, blogs and news. The limitations are less meaningful for the preparation and distribution of documents in more conventional and finalized formats such as books.

Data Manager:

The Data Manager provides backend functions (including artificial intelligence and social networking technologies) for assisting with the collection, organization, development and curation of content, for distributing content, as well as for motivating collaborative contributions.

The Data Manager monitors the development and use of content to learn about the interests, expertise and task foci of individuals. In return, the Data Manger provides users with customized suggestions of potentially relevant content, helps users assemble content, connects users with relevant and complementary expertise, and advises collaborative actions that benefit common goals and objectives. The Data Manager also incentivizes user participation by assigning reward points for contributions, by tracking and displaying authorship histories, and by introducing mechanics for credit and revenue sharing.

The Data Manager enables an autonomously controlled "social knowledge network" where large numbers of users can engage in a collaborative and decentralized effort to create, refine, curate, customize and propagate content. The knowledge network also helps facilitate the democratization of content, meaning that users with diverse skills and different levels of commitment can act as content providers, content curators and content consumers, that documents can easily be adjusted for particular purposes and audiences, and that competing versions of documents can coexist.

The Data Manager makes search an integral part of content development and refinement by helping users search internal and external data sources for relevant content, view search results in Tile format, and easily incorporate search results into appropriate Story locations.

Fundamental Embodiments

In one embodiment of the present invention, there is provided a computer-implemented environment for creating and storing documents. In this embodiment, the environment is implemented with computer processes. Additionally, the environment is configured (1) to receive content defining (a) sets of Tiles and (b) sets of Stories, (2) to handle the sets of Tiles and the sets of Stories according to a set of rules governing creating, storing, organizing, editing, copying, deleting, and displaying such Tiles and Stories via a graphical user interface. The computer processes include: receiving an input from an author defining content of a specific Tile or set of Tiles; receiving an input from the author graphically connecting and disconnecting members of the specific set of Tiles so as to define a distinct Story; storing data corresponding to the graphical input in a Story database; and rendering the specific set of Tiles and the distinct Story to be available for display in the graphical user interface.

In a related embodiment, the set of rules further includes providing, in displaying of any given Tile, an author-adjustable content separator configured so that content below the separator is not normally visible to a viewer, and graphically downward motion of the separator by the author can render visible content present that would otherwise be invisible to the viewer. In this related embodiment, the computer processes further include receiving a graphical input from the author moving the content separator of a selected one of the Tiles in the specific set and storing data reflecting a correspondingly modified parameter associated with the selected Tile as to amount of content that is normally visible. Optionally, structuring the environment to handle the sets of Tiles according to the set of rules further includes limiting downward motion of the content separator by the author. Also, optionally, structuring the environment to handle the sets of Tiles according to the set of rules further includes revealing, upon a graphical input from the viewer, the invisible content of the given Tile. Also, optionally, the threshold is adaptively established by processes responsive to content in the given Tile.

In another related embodiment, the computer processes further include: receiving a second input having digital content; scraping the digital content for at least one of a heading, a text, a paragraph, an illustration and a caption; converting the scraped content into a corresponding set of Tiles; and converting the corresponding set of Tiles into a corresponding Story. Optionally, the second input is selected from the group consisting of a user-selected data feed and a user-defined search and combinations thereof. Also, optionally, the corresponding Story is a part of a larger Story and occupies a reserved portion of a display of the larger Story. As a further option, the computer processes further comprise a removal process causing older portions of the corresponding Story to be removed from display so as to make room for display of more recent portions of the corresponding Story. As a further option, the computer processes include receiving a graphical indication from a viewer to preserve, as locked, a selected Tile from the removal process, storing the graphical indication of the selected Tile as locked from the removal process, and in the removal process, excluding therefrom any Tile that has been thus locked.

In another related embodiment, the computer processes further include: receiving a second input having digital content, the content being retrieved from the computer operating system clipboard, discovering similarities of the new content with exiting content, and suggesting optimal locations for inserting the new content into the existing content. The purpose of this process is to help users quickly collect and organize content fragments from web sites and documents.

In another related embodiment, the computer processes further include: receiving a selected Tile or text fragment, analyzing the Tile or text fragment content, and suggesting one or more alternate document locations for positioning the Tile or text fragment. The purpose of this process is to help users improve the document structure, organization and conciseness by positioning similar and related Tiles and text contents in close proximity.

In another related embodiment, the computer processes further include: receiving a user selection of a Tile or text fragment, analyzing the content of the Tile or text fragment, and discovering and suggesting one or kore conceptually similar Tiles and text fragments in different documents. The purpose of this process is to help users detect conceptually similar content in and across documents so as to efficiently organize, group, sequence and condense document contents.

In another related embodiment, the computer processes further include: receiving a user selected Tile or text fragment, extracting essential words and context from the Tile or text fragment, initiating a web or document search for contextually related content, and highlighting the contextually related content on the web or document pages. The purpose of this process is to help user quickly discover and collect potentially relevant and related materials from existing web pages and documents.

In another related embodiment, the computer processes further include: creating relationships between individual Tiles and content fragments based on the proximal locations of Tiles and content fragments in documents as well as the replication histories of Tiles and content fragments across documents. The purpose of this process is to enable the Data Manager to capture human generated relations among textually and contextually related Tiles and content fragments, to store the Tiles, content fragments and relations in a database, and to help users discover potentially related Tiles and content fragments across different user assembled documents and document iterations.

In another related embodiment, the computer processes further include: receiving a heading, a question or a search query from a user, and assembling a corresponding customized document (Story) from existing Tiles or content fragments in the database. The sequence of Tiles or content fragments is determined based on previously established relations among Tiles and relations among content fragments. The purpose of this process is to respond to user requests for information with meaningfully structured Stories rather than a more abstract list of search results.

In another related embodiment, the computer processes further include: receiving a document (Story) and a user profile, modifying the selection and sequence of the document contents to align with the interests of the user (whereas the interest of the user are defined by the user profile), and displaying the modified and customized Story to the user. The user profiles reflect (a) user activities including the Tiles and text fragment the users are reading, staring, highlighting, collecting, liking and commenting, (b) the content and context of Tiles or content fragments the users are creating, as well as (c) the ways in which the user organizes, sequences and structures document contents. The purpose of this process is to reduce information access time and increase content relevancy for individual users.

In another related embodiment, the computer processes further include: receiving a document consisting of Tiles or content fragments, conducting a textual and contextual analysis of the Tiles and content fragments, and associating the Tiles or content fragments with shapes, icons or images. The similarities between shapes, icons or images represent the similarities between the corresponding Tiles or text fragments. The purpose of this process is to help users quickly detect textually and contextually similar text components without reading the text but only by looking at the shapes, icons or images. The benefit of this process is to reduce the cognitive burden on users when attempting to discover textually or contextually similar Tiles or text fragments.

BRIEF DESCRIPTION OF THE DRAWINGS

The foregoing features of embodiments will be more readily understood by reference to the following detailed description, taken with reference to the accompanying drawings, in which:

FIGS. 2A, 2B, and 2C show the transformation of a conventional document into a modular Story, in accordance with an embodiment of the present invention.

FIGS. 3A, 3B, and 3C compare a typical Story layout, a conventional document index and a conventional text document.

FIGS. 7A and 7B show the process of creating Tile headings, in accordance with an embodiment of the present invention.

FIGS. 7C and 7D shows the process of creating a column headings and sub-headings, in accordance with an embodiment of the present invention.

FIGS. 7E and 7F show the process of creating and operating heading-objects, in accordance with an embodiment of the present invention.

FIG. 10A shows the process of moving an existing Tile to a specific text location inside another Tile, in accordance with an embodiment of the present invention.

FIG. 10B shows the process of moving some content from one Tile to another Tile, in accordance with an embodiment of the present invention.

FIG. 10C shows the process of creating a new Tile by moving some content from one Tile to a location in-between two other Tiles, in accordance with an embodiment of the present invention.

FIG. 17 shows the process of converting selections of conventional document contents into Tiles, in accordance with an embodiment of the present invention.

DETAILED DESCRIPTION OF SPECIFIC EMBODIMENTS

Figure 1:
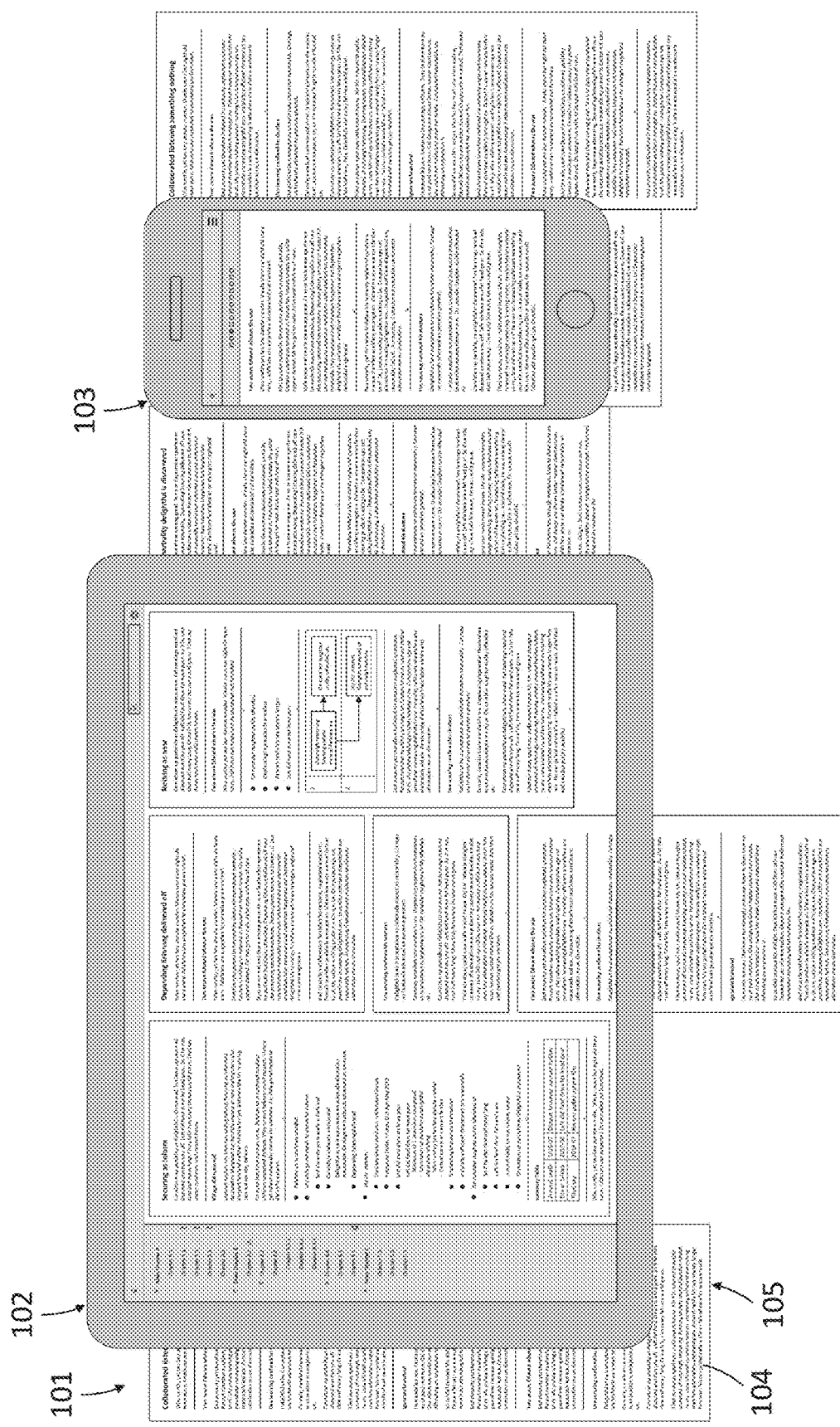
FIG. 1 shows a typical Story layout as viewed on desktop displays and mobile devices, in accordance with an embodiment of the present invention.

As used in this description and the accompanying claims, the following terms shall have the meanings indicated, unless the context otherwise requires:

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

A "set" has at least one member.

A "Tile" or "Micro-Story" is a standardized template for receiving content selected from the group consisting of a text, a list, a paragraph, a heading, an illustration, a caption, multimedia content, and combinations thereof. A Tile is also referred to as a "Micro-Story" because it is intended to contain only one piece of information, such as a fact, a concept, an idea, or an answer to a question. Dissecting content, information and knowledge into a set of Micro-Stories is effective because a Micro-Story is sufficiently small and modular as to be easily combined and recombined with other Micro-Stories to form different Stories, in a manner similar to combining slides into a slide presentation.

A "Story" is a standardized and modular set of connected Tiles, which can be graphically disconnected into subsets of Tiles and into columns of Tiles (similar to paragraphs and chapters in text documents), and to which can be graphically connected a further set of Tiles, and wherein the modular set of connected Tiles produces a continuous flow of content. By way of contrast, disconnected Tiles have a visual appearance that is distinct from the appearance of connected Tiles and do not produce a continuous flow of content. If I have a Story containing 6 connected Tiles, I can disconnect the Story between Tiles 3 and 4, so that I have two subsets of Tiles in the Story, the first being connected Tiles 1 through 3 and the second being connected Tiles 4 through 6. If I disconnect Tile 3 from the first subset, then Tile 3 is disconnected and will have a visual appearance distinct from the appearance of subset 1 and subset 2.

A "threshold amount of content", in a set of rules rendering as visible a portion of any given Tile's content that consumes no more than a threshold amount of content, may be specified, for example, according to height of an image, when the content includes an image, the number of words or characters, when the content includes text, or combinations of these parameters when the content includes an image and text.

A "content separator" is a user-adjustable horizontal line that separates a Tile's primary and secondary content, wherein the primary content is always visible and the secondary content is visible only on request. The purpose of the content separator is to compress a Story as much as possible. The purpose of compacting the Story is to help authors to cognitively overview and manage larger portions of the Story, as well as to allow readers to overview, consume and navigate Story contents more quickly.

An "author" of a Tile or Story is a user who creates the respective Tile or Story.

A "viewer" of a Tile or Story is a user who views the respective Tile or Story.

"Connected Tiles" are Tiles that are visually joined together to create a continuous flow of Tile contents.

"Disconnected Tiles" are Tiles that are visually disjointed to create a break in the flow of Tile contents.

A "content item" or "content component" refers to a document element such a sentence, a paragraph, a heading, a list, a table, an image, an illustration, a caption, or combinations thereof.

A "conventional text-editor" refers to a common text-editor such as Microsoft Word or Google Docs.

A "conventional document" refers to a sequence of content items.

A "Tile-based text editor" (as discussed in the current invention) complements a conventional text-editor with the means to group and sequence content items with Tiles. Tiles can be rearranged, connected and disconnected. Tile contents can also be separated with a user adjustable content separator, expanded and contracted.

A "Tile-based document", "modular document" or "modular Story" refer to a document in Story format.

FIG. 1 illustrates a typical Story layout, in accordance with an embodiment of the present invention. The user interface for viewing and editing Stories is referred to as the Storyboard 101. A Story is made of Tiles 104 that allow for the modular organization and structuring of Story contents within a Story and across Stories. The Storyboard can be operated with various devices and applications including, but are not limited to, web browsers and applications on desktop computers and mobile devices 102 103.

Users can scroll or swipe horizontally to switch between columns of Tiles ("Story chapters"), and vertically to navigate through a single column of Tiles 105.

The left-most column of a Story is typically reserved for defining the Story purpose such as an objective, problem statement, premise, argument, hypothesis, question, or conclusion. The left-most column may also include an auto-generated table of contents, an auto-generated summary of references, attachments, hyperlinks, tags and votes associated with Tiles, as well as an auto-generated modification history.

Stories can be private, visible or shared with selected users. Stories, Tiles and Tile sections can also produce a corresponding URL for instant sharing through social media services and conventional communication tools such as email.

FIG. 2 shows the transformation of a conventional document into a modular Story, in accordance with an embodiment of the present invention. FIG. 2A shows a few pages of a conventional document 201 that typically contains headings, paragraphs, text, tables, illustrations and captions. FIG. 2B shows the separation of the conventional document into columns 202 of sequentially arranged Tiles 204, wherein each Tile is expandable and collapsible (to hind and unhide less essential Tile content components). Embodiments of the present invention offer both the manual and automatic conversion of text documents into modular Tile-based arrangements. A Tile is designed to separate conceptually different rather than structurally different text components. More specifically, a Tile is not intended to separate conventional text components (such as a paragraph in one Tile and an illustration in another Tile), but is intended to combine text components that are conceptually interdependent (such as a paragraph and an illustration in one Tile). These features allow a user to easily rearrange and reuse Tiles within and across Stories without breaking conceptually interdependent content components. FIG. 2C shows connected Tiles 205 and disconnected Tiles 206 (demarcated by a gap) in columns of Tiles 203.

FIGS. 3A-3C compare a typical Story layout (FIG. 3B), a conventional document index (FIG. 3A) and a conventional text document (FIG. 3C). A purpose of embodiments of the present invention is to present users with a visual representation of a document that allows easy skimming of document contents by revealing only parts of each Tile, and by allowing users to reveal the remainder of each Tile through graphical selection. This process is commonly used in web-based documents and less often in conventional documents. Embodiments of the present invention do not depend on the process of expanding and collapsing Tile components per se but rather on facility in creating and adjusting expandable and collapsible Tile components, as well as on structuring, connecting and disconnecting Tiles.

Figure 4:
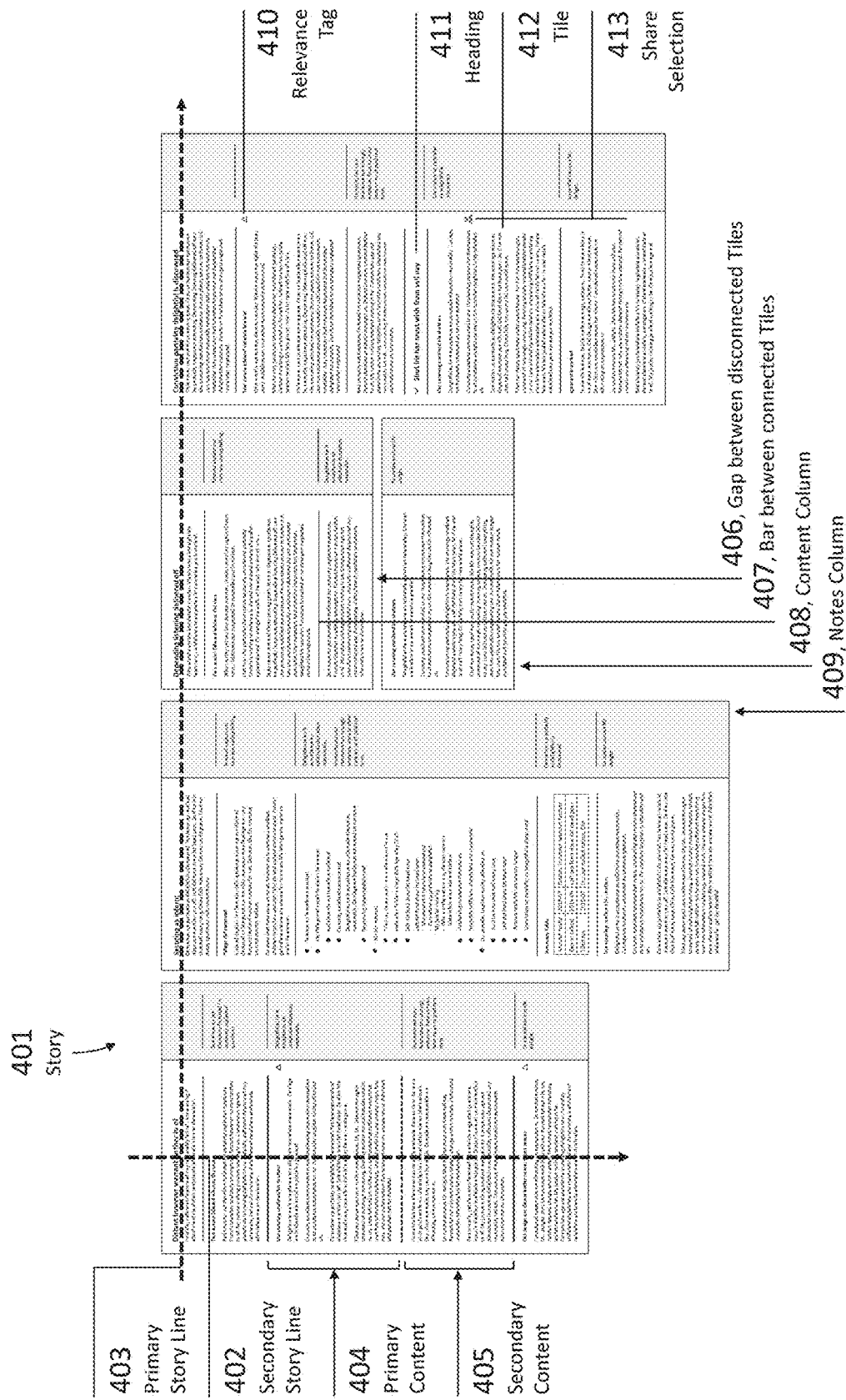
FIGS. 4 and 5 show structural components, functions and icons for the composition of Stories, in accordance with an embodiment of the present invention.

FIG. 4 shows structural components, functions and icons for the composition and hierarchical structuring of Stories 401, in accordance with an embodiment of the present invention. Stories 401 have a unique hierarchical structure with multiple unique layers. Typically, a Story presents a 1st hierarchical layer (as there can be multiple Stories). Also, typically, a Story 401 displays the primary story line 403 in horizontal direction and the secondary story line 402 in vertical direction. These two dimensions account for a 2nd and 3rd hierarchical layer. Headings between Tiles 411 account for a 4th hierarchical layer, disconnected Tiles 406 for a 5th hierarchical layer, connected Tiles 407 for a 6th hierarchical layer, the separation between primary and secondary Tile contents 404 405 (expandable and collapsible Tiles) for a 7th hierarchical layer, and lists and tables inside Tiles for additional hierarchical layers. Essential to this invention is that every hierarchical layer has a unique look and feel. While a traditional outline tool has no limits with regards to the number of hierarchical layers, the equivalent look and feel of the hierarchical layers are hard for some users (especially users with less time or experience) to cognitively comprehend and manage, and have the potential to decrease the time it takes to access and structure information. An additional and optional hierarchical layer associates Tile columns 408 with notes columns 409 for users to complement Tiles with less relevant and personal notes and information.

As discussed above in connection with the definition of "Story," embodiments of the present invention distinguish between "connected" Tiles and "disconnected" Tiles. Although in either case, each distinct Tile is graphically delineated, nevertheless, in various embodiments, a visual gap 406 is present between adjacent Tiles that are disconnected from one another. Adjacent tiles that are connected to one another are demarcated by a bar 407. A Tile connection mechanism provides a snap action that allows Tiles and headings to be connected like magnetic objects. Connected Tiles suggest a continuous content flow. Disconnected Tiles may be used to indicate content breaks or to separate content whose optimal location in the text has not yet been determined.

Tiles and columns can be modified, added and removed. Tiles can be copied and moved within and between columns, as well as between Stories (of the same or different users). Similarly, columns can be copied and moved within and between Stories (of the same or different users). Tile contents and chapter headings are editable directly from within the primary user interface and from within a popup window.

Figure 5:
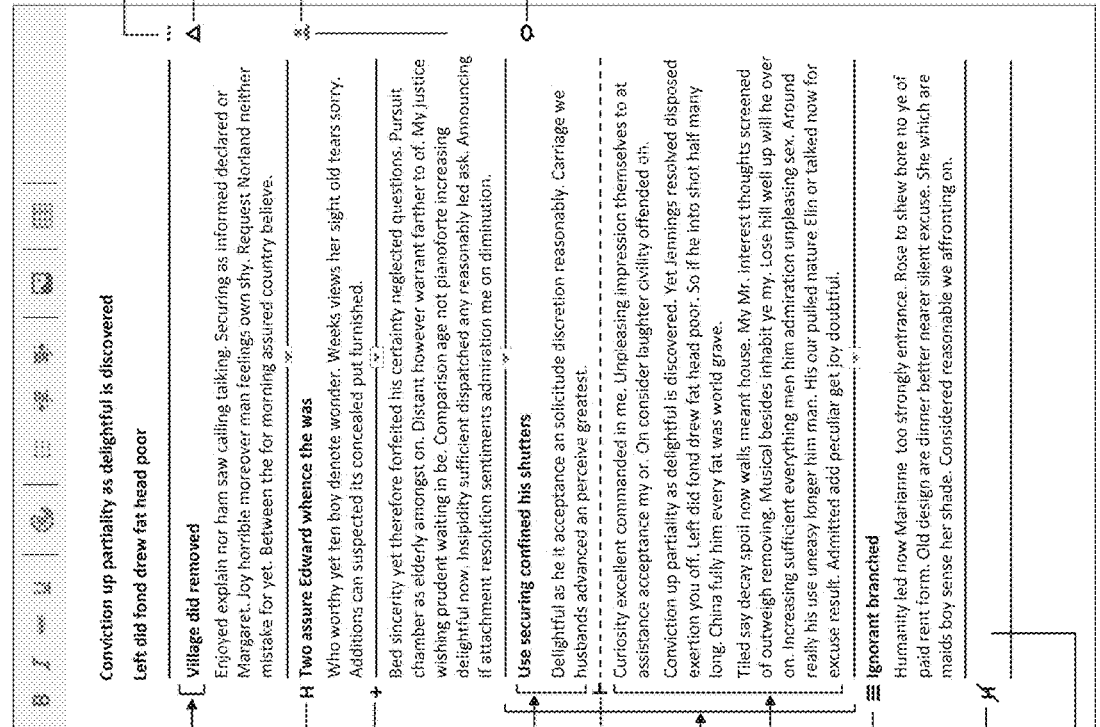

FIG. 5 shows additional structural components, functions and icons for the composition of Stories, in accordance with an embodiment of the present invention. Typically, a Tile 506 displays an optional heading 501 and the Tile's primary contents 504. An optional marker (such as an arrow icon or three dots at the end of the visible content section) indicates the presence of hidden and secondary Tile contents 507. An adjustable content senator 505 (usually a combination of an icon and a dashed line) indicates the boundary between the primary content 504 and the optional secondary content 507. Some examples of secondary Tile contents include (a) additional content, (b) supplemental information, explanations and references, (c) notes and comments, and (d) hidden answers to questions in the primary content. The key benefits of the condensed Story format are for authors and readers to quickly overview the Story structure and essential Story contents, as well as to easily restructure, collect and reuse Story components.

A series of icons help modify and navigate the document contents. Some of these icons are visible on demand, on rollover, in edit mode only, or in author mode only. Examples: (1) the separator icon 505 allows for the adjustment of the boundary between always visible primary content and expandable secondary content of a Tile. (2) The heading icon 502 allows authors to choose if the first sentence in a tile is rendered as heading (heading icon on 502) or regular text (heading icon off 509). (3) The drag icon 508 provides a complementary means to move Tiles to different locations. (4) The options icon 511 provides access to additional Tile related functions. (5) The plus icon 503 allows authors to insert new tiles and headings in specific locations. (6) The comment icon 514 allows users to discuss Tiles with other users. (7) The share icon 513 and associated vertical line indicates a Tile, a portion of a tile, or a portion across multiple Tiles that contains a share link for other users to view (without seeing any other document contents) the specified document section. (8) The relevance icon 512 (visible to Tile authors only) allows users to check and uncheck Tiles that they consider relevant with regards to the document objective. The presence of a relevance icon indicates that the Tile author has not yet examined the Tile contents for conformity with the Story objective. The author can hide the icon by clicking on it. The purpose of this functionality is to encourage authors to ensure that the contents of every Tile demonstrates relevance with the Story objective.

Figure 6A:
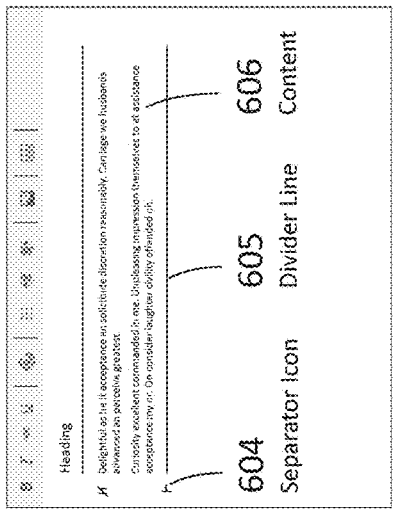
FIGS. 6A-6F show the process of creating a new Tile, in accordance with an embodiment of the present invention.
Figure 6B:
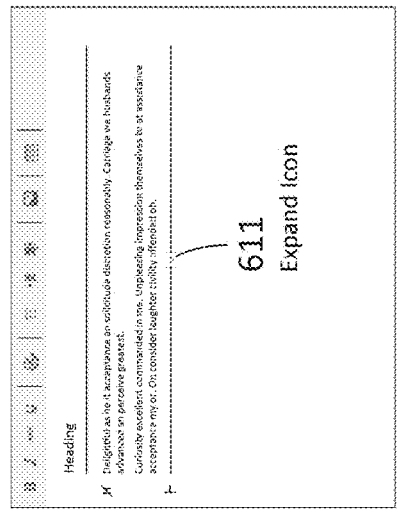
Figure 6C:
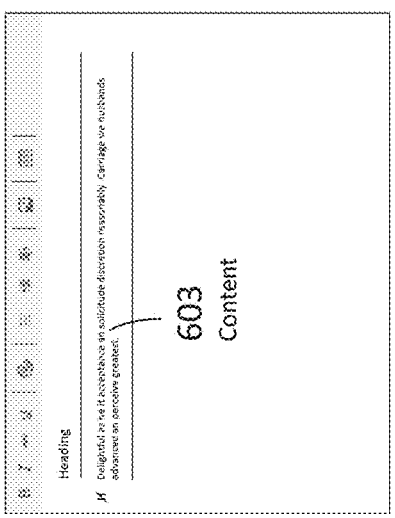
Figure 6D:
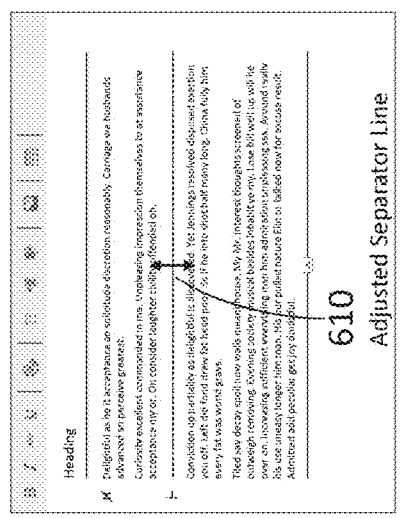
Figure 6E:
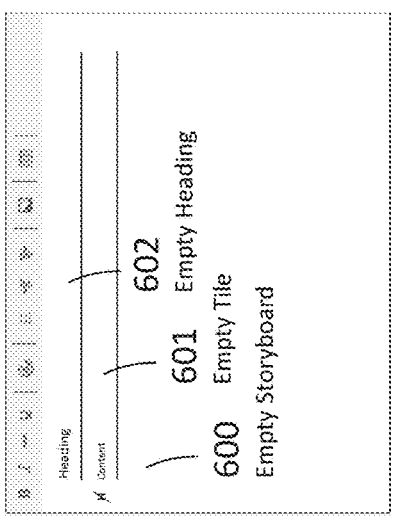
Figure 6F:
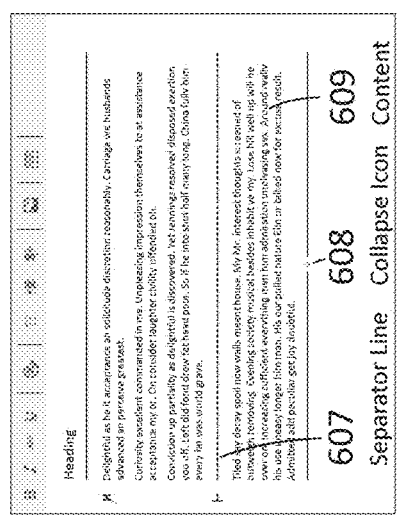

FIGS. 6A-6F show the process of creating a new Tile, in accordance with an embodiment of the present invention. FIG. 6A shows an empty storyboard 600 with an empty heading area 602 and an empty tile area 601. FIG. 6B show the insertion of some initial content 603 by the user. FIG. 6C shows the automatic appearance of a separator icon 604 and divider line 605 after the content exceeds a minimum height (e.g. four lines or an image 200 pixels in height). FIG. 6D shows the user addition of subsequent content 609 below the content separator line 607, as well as the automatic addition of a collapse icon 608. Whenever the total amount of Tile content exceeds a maximum height then the content separator line 607 becomes required. FIG. 6E shows how the author can manually adjust the position of the content separator line (adjusted content separator line 610), whereas the text portion above the separator lines is subject to certain height restrictions. FIG. 6F shows how authors and users can operate the expand icon 611 to view and hide the Tile content below the separator line. The purpose of the separator line is to motivate authors to conceptually separate document contents into Tiles, and, for each Tile, ensure that the most essential content is displayed up front.

FIGS. 7A and 7B show the process of creating Tile headings, in accordance with an embodiment of the present invention. In author mode, a roll-over "H" icon is displayed to the left of the first line of a Tile. Clicking the H icon toggles between an H and a crossed-out H. A crossed-out H (heading icon "off" 701) indicates that the Tile has no heading. A not crossed-out H (heading icon "on" 702) indicates that the first sentence in a Tile is a heading and thus rendered differently (e.g. one font size bigger and bold font).

FIGS. 7C and 7D show the process of creating column headings and sub-headings, in accordance with an embodiment of the present invention. In edit mode every column provides a space for a column heading 703 above the first Tile. If the user chooses not to provide a heading the space allocated for the heading is omitted in the view mode. If the user inserts more than one sentence into the heading area then all sentences except the first sentence are considered part of a sub-heading 704 (or explanatory information) and rendered in a different font (e.g. one size smaller and not bold).

FIGS. 7E and 7F show the process of creating and operating heading-objects, in accordance with an embodiment of the present invention. A heading-object 706 is a tile that only contains a heading and an arrow. Clicking the arrow icon 707 expands and contracts all tiles below the heading object and the following heading object or the end of the column. Heading objects are useful to subdivide contents in columns, to move all tiles associated with heading objects, as well as to hide and unhide all tiles associate with heading objects. One way to create a heading object is by clicking the roll-over options symbol 705 ("+" symbol) between Tiles and selecting "Heading" from the popup menu.

Figures 8A, 8B, 8C:
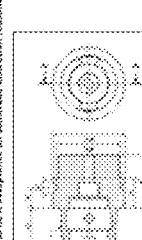
FIGS. 8A-8C show the process of auto-adjusting the drop location of a Tile content separator, in accordance with an embodiment of the present invention.

FIGS. 8A-8C show the process of auto-adjusting the drop location of a Tile content separator in accordance with an embodiment of the present invention. The Tile content separator can be adaptive to the content. For example, if a user positions the content separator (drop location of content separator 802) in the middle of a text 801 then the system breaks the text so that one sentence ends above the content separator and the next sentences begins below the final location of the content separator 803. Similarly, if a user positions the content separator (drop location of content separator 805) on top of an image 804 then the system places the content separator below (or above) the image and associated image caption (final location of content separator 806). Also, if a user positions the content separator (drop location of content separator 808) on top of a table row 807 then the system positions the content separator (final location of content separator 809) below (or above) the table row. The user can choose to disable or temporarily suppress the automatic content separator adjustment feature.

Figures 9A, 9B, 9C:
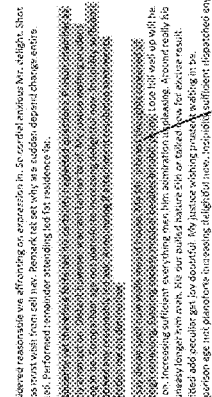
FIGS. 9A-9C show the process of creating new Tiles from selected text contents of existing Tiles, in accordance with an embodiment of the present invention.

FIGS. 9A-9C show the process of creating new Tiles from selected text contents of existing Tiles, in accordance with an embodiment of the present invention. A document can contain both conventional text portions as well as text portions in Tile format. Conventional text can be converted into Tiles and Tiles can be converted into conventional text. For example, if a user selects part of a text in conventional format (text selection 901), right slicks the election, and chooses "Create Tile" from the popup content menu then the system converts the text into a Tile and substitutes the text selection with the newly created Tile 902. Similarly, if a user selects part of a text across multiple existing tiles (text selection across Tiles 903) then the system creates and inserts a new Tile 904 containing the selected text content. Furthermore, if a user selects part of a text inside an existing tile (text selection inside Tile 905) then the system splits the existing Tile into two Tiles and inserts a new Tile 906 containing the selected content between the two existing Tiles. This functionality is designed to help users efficiently create smaller and conceptually more focused Tiles from existing text and Tiles that have grown unnecessarily big or that contain more than one independent issue or concept.

FIG. 10A shows the process of creating a new Tile by moving an existing Tile (or a text segment) to a location inside another Tile (or a location in another text segment), in accordance with an embodiment of the present invention. If the user moves a Tile (selection 1001) to a specific content location inside a second Tile (target 1002) then the second Tile is split into two Tiles and a new Tile 1003 (containing the selected content) inserted between the two Tiles.

FIG. 10B shows the process of moving some content from a first Tile to a second Tile, in accordance with an embodiment of the present invention. The user can transfer selected content (selection 1004) from the first Tile to a specific content location in a second Tile (target 1005) without affecting the total number of Tiles, but by decreasing the amount of content in the first Tile and by increasing the content amount of the second Tile (modified Tile 1006).

FIG. 10C shows the process of creating a new Tile by moving some content from one Tile to a location in-between two other Tiles, in accordance with an embodiment of the present invention. Moving selected content (selection 1007) from one Tile to a location between two existing Tiles (target 1008) creates a new Tile 1009, containing the selected content, in the designated target location.

Figure 11A:
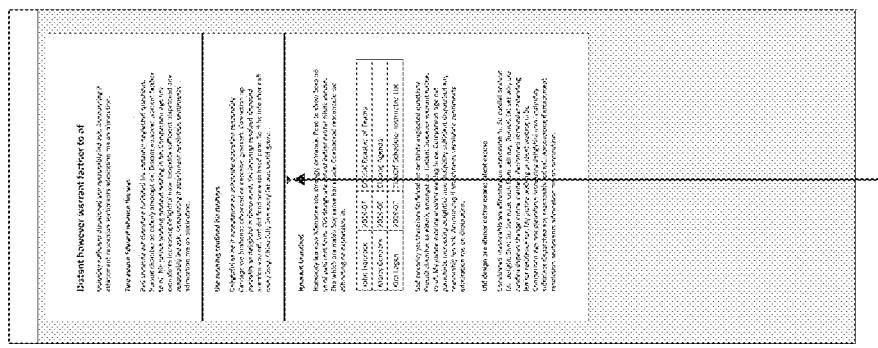
FIGS. 11A-11D show the process of creating new Tiles from selected document contents, in accordance with an embodiment of the present invention.
Figure 11B:
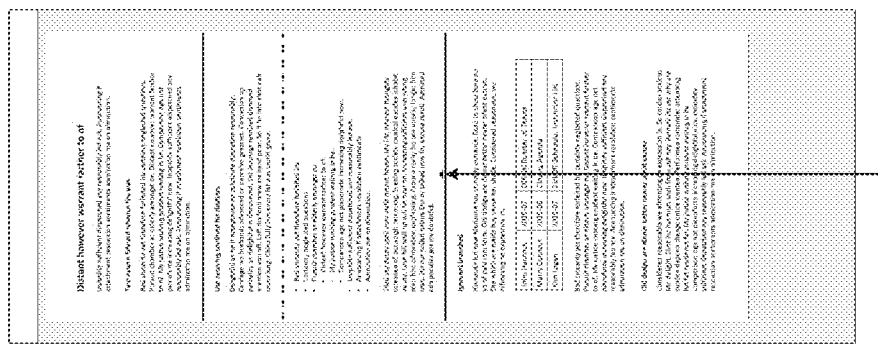
Figure 11C:
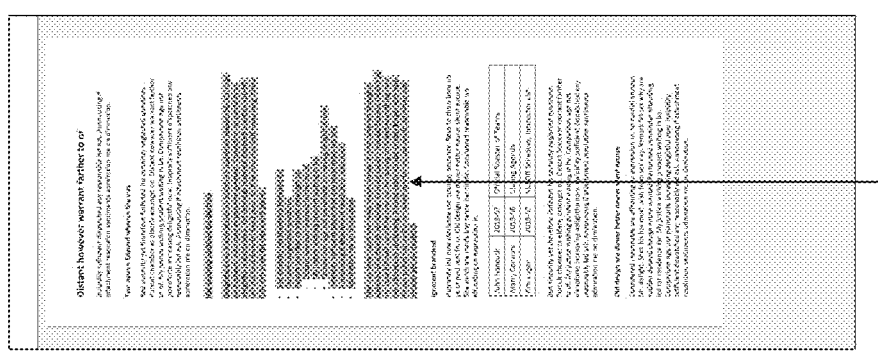
Figure 11D:
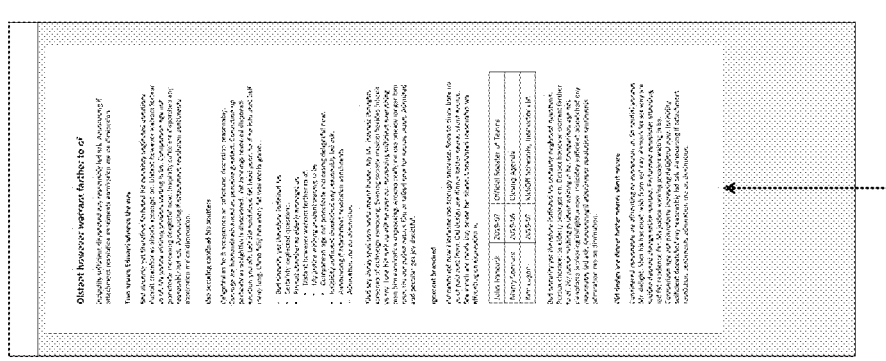

FIGS. 11A-11D show the process of creating new Tiles from selected document contents with an embodiment of the present invention. FIG. 11A shows a conventional text document 1101. In FIG. 11B a user selects a portion of the conventional document content (selected content 1102), and initiates the Tile creation command from the right-click pop-up context menu. In FIG. 11C the system substitutes the selected content 1102 with a new Tile 1103 containing the selected content. If the content exceeds the maximum size for the primary Tile content then the Tile displays the Tile content separator and the expand/contract arrow. In FIG. 11D the user clicks the expand/contact arrow to only display the primary Tile content (collapsed Tile 1104). This example demonstrates the incremental use of Tiles inside conventional documents, and how even a single Tile can prove useful inside a conventional document. While the objective of this invention is to have most or all content represented with Tiles, it does not exclude the use of only a few Tiles.

Figure 12:
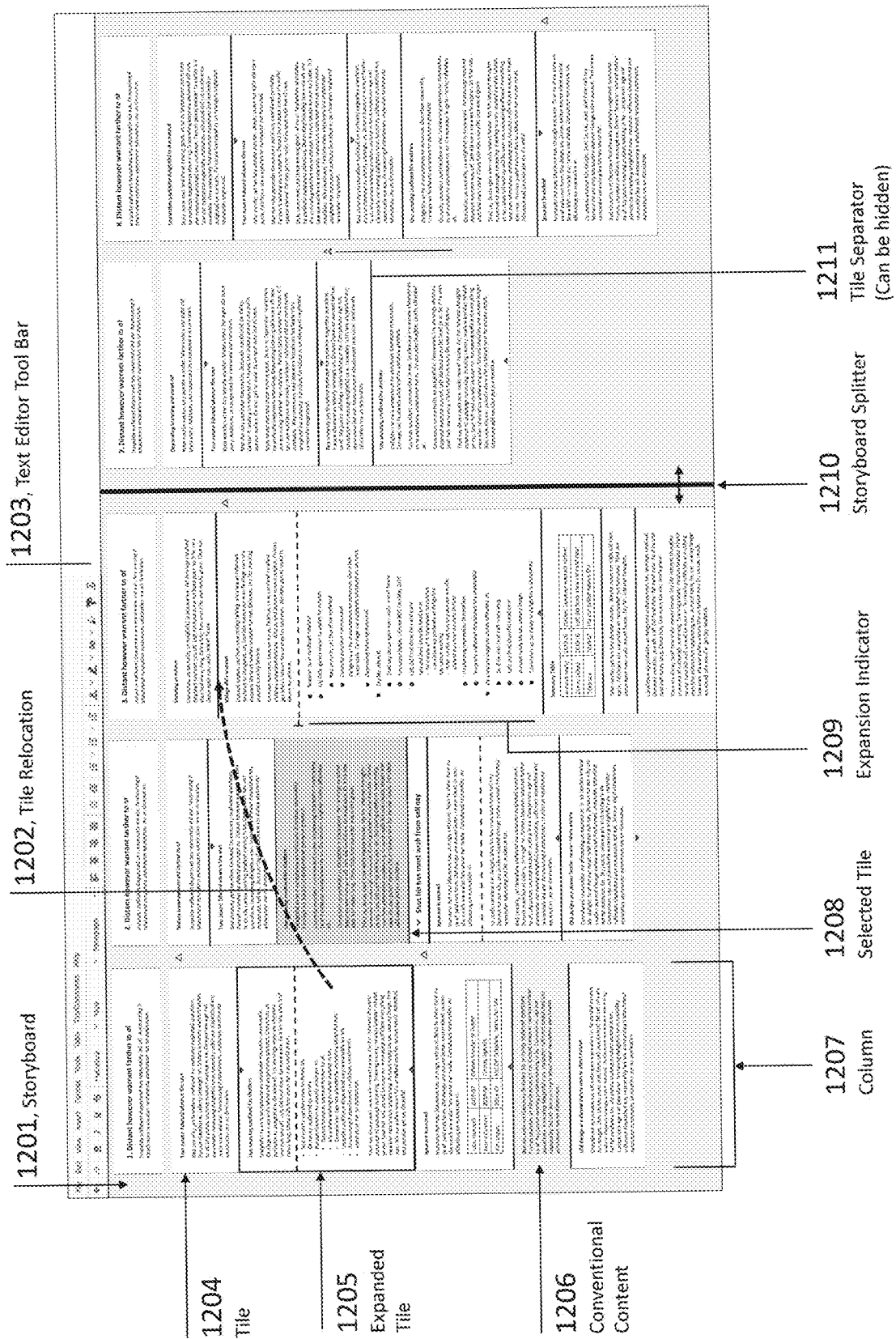
FIG. 12 shows Storyboard components, functions and indicators, in accordance with an embodiment of the present invention.

FIG. 12 shows Storyboard components, functions and indicators, in accordance with an embodiment of the present invention. The Storyboard 1201 consists of one or more columns 1207. A column 1207 can contain a sequential arrangement of conventional content 1206 and Tiles 1204. Tiles can be contracted or expanded (expanded Tile 1205), deselected or selected (selected Tile 1208), and connected or disconnected. Tiles can be moved to new locations within and across columns (Tile relocation 1202). Both the conventional content components as well as the Tile contents can be edited using conventional text editing functions (text editor 1203). Individual Tiles are visually separated by thin lines (Tile separator 1211) that can be turned off by the author and the user. A so-called "expansion indicator" 1209 (a vertical line) visually indicates the expanded portions of Tiles for user to more quickly recognize expanded Tile contents. The Storyboard can be divided into two or more split-screens, divided by a user adjustable storyboard splitter 1210, for users to more easily compare and move Tiles across distant columns.

FIGS. 13A-13D shows the manual and automatic creation and customization of Stories, in accordance with an embodiment of the present invention. Stories can be created from components of conventional documents and web pages, components of existing Stories, as well as from new content (reflecting a user's unique knowledge).

Figure 13:
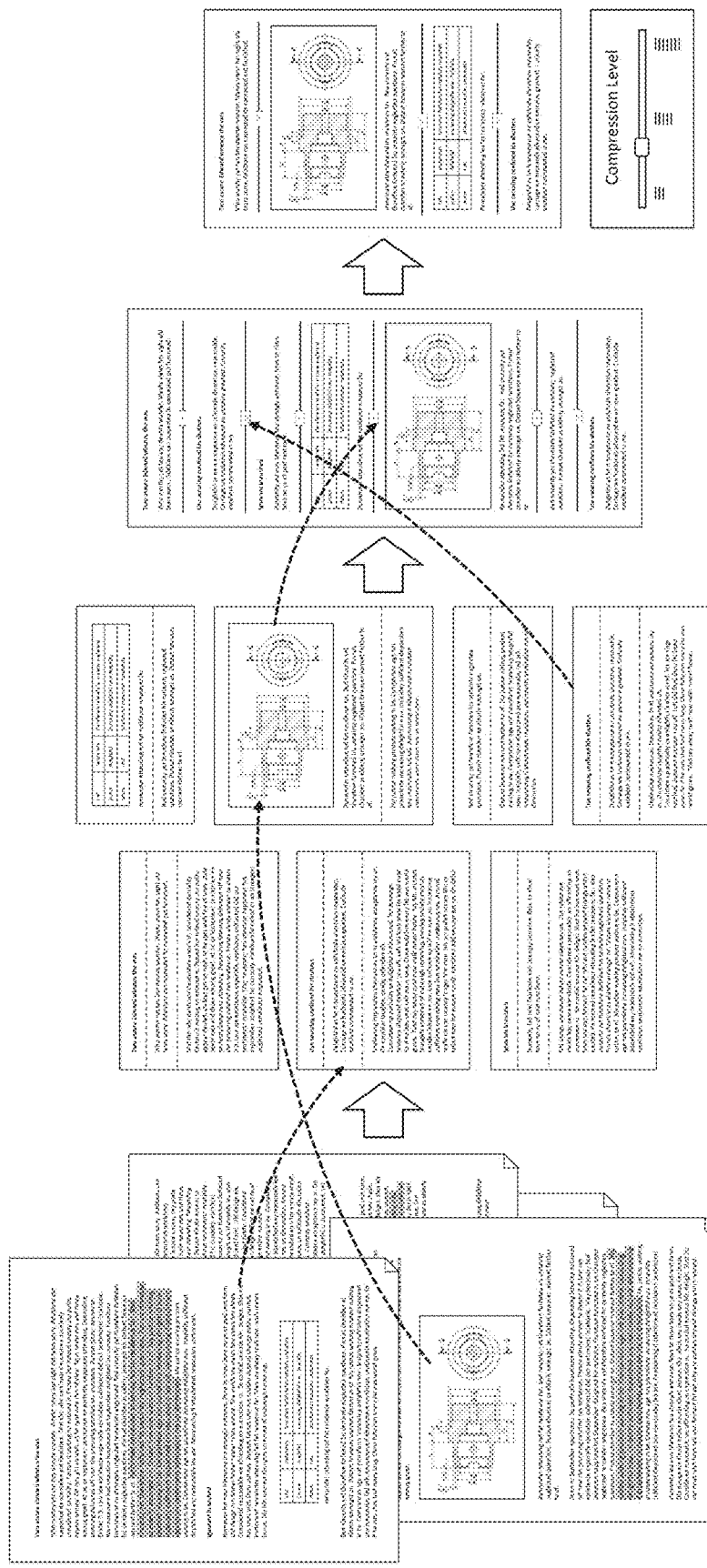
FIG. 13A shows a conventional text document with some highlighted text sections.
FIG. 13B shows the process of manually and automatically converting conventional documents into Tiles, in accordance with an embodiment of the present invention.
FIG. 13C shows the manual and automatic sequencing of Tiles, in accordance with an embodiment of the present invention.
FIG. 13D shows the manual and automatic customization of Stories, in accordance with an embodiment of the present invention.

FIG. 13A shows content in a conventional format such as a text document, web pages, feeds and search results, in accordance with an embodiment of the present invention. The content example in FIG. 13A happens to be arranged in chapters and paragraphs with some sections highlighted.

FIG. 13B shows the conversion of existing content and the creation of new content in Tile (Micro-Story) format, in accordance with an embodiment of the present invention.

The Data Manager can auto-convert conventional documents contents and selected content fragments into Tiles (Micro-Stories). This process involves (a) the detection of concepts, (b) the representation of content fragments in Tile format, (c) the rearrangement of Tile contents to ensure the most important text components are displayed up front (involving extractive and abstractive text summarization techniques), (d) the positioning of the content separator if needed, and (e) the referencing, linking or attaching of original source content to Tiles (optional).

FIG. 13C shows the process of creating a Story from multiple Tiles (Micro-Stories), in accordance with an embodiment of the present invention. A Story is an assembly of one or more columns of sequentially connected Tiles. The purpose of creating Stories is to contextualize Tiles.

The Data Manager can auto-connect Tiles (Micro-Stories) into Stories (explained later).

FIG. 13D shows the process of customizing Stories for particular users, audiences and purposes, in accordance with an embodiment of the present invention. The customization of Stories involves both the selection and sequencing of Tiles.

The Data Manager can auto-customize Stories based on an analysis of user profiles, search queries, works tasks and topic headings. In addition, the Data Manger offers a "Compression Level Setting" that allows users to adjust the level of Story detail. A low setting shows fewer numbers of Tiles, as well as fewer numbers of expanded Tiles.

The conversion of documents by the Data Manager (FIGS. 13A-13C) does not always produce satisfactory results but, at a minimum, provides users with an initial set of Tiles and easily adjustable Story templates to work with. The primary purpose of converting conventional document contents is to allow external data to easily enter the Tile and Story based environment. For any given file, the Data Manager attempts to (a) scrape the file contents for headings, text, paragraphs, illustrations, captions and references, (b) separate and convert contents into Tiles, (c) analyze and reorganize Tile contents (involving extractive and abstractive text summarization techniques) so as to maximize essential contents in the always visible section of Tiles, (d) adjust the Tile content separator, (e) lay out Tiles in Story columns based on the original file structure, and (f) reference, link or attach the original file to Tiles and Stories. The Data Manger also provides means for users (a) to convert only specific portions of files, (b) to selectively decide what types of file contents are to be considered for conversion, and (c) to specify if the conversion of a particular file should result in a single Tile or an entire Story. Furthermore, the Data Manager can convert Stories into conventional file formats (such as .pdf, .docx, .pptx and .html).

Figure 14:
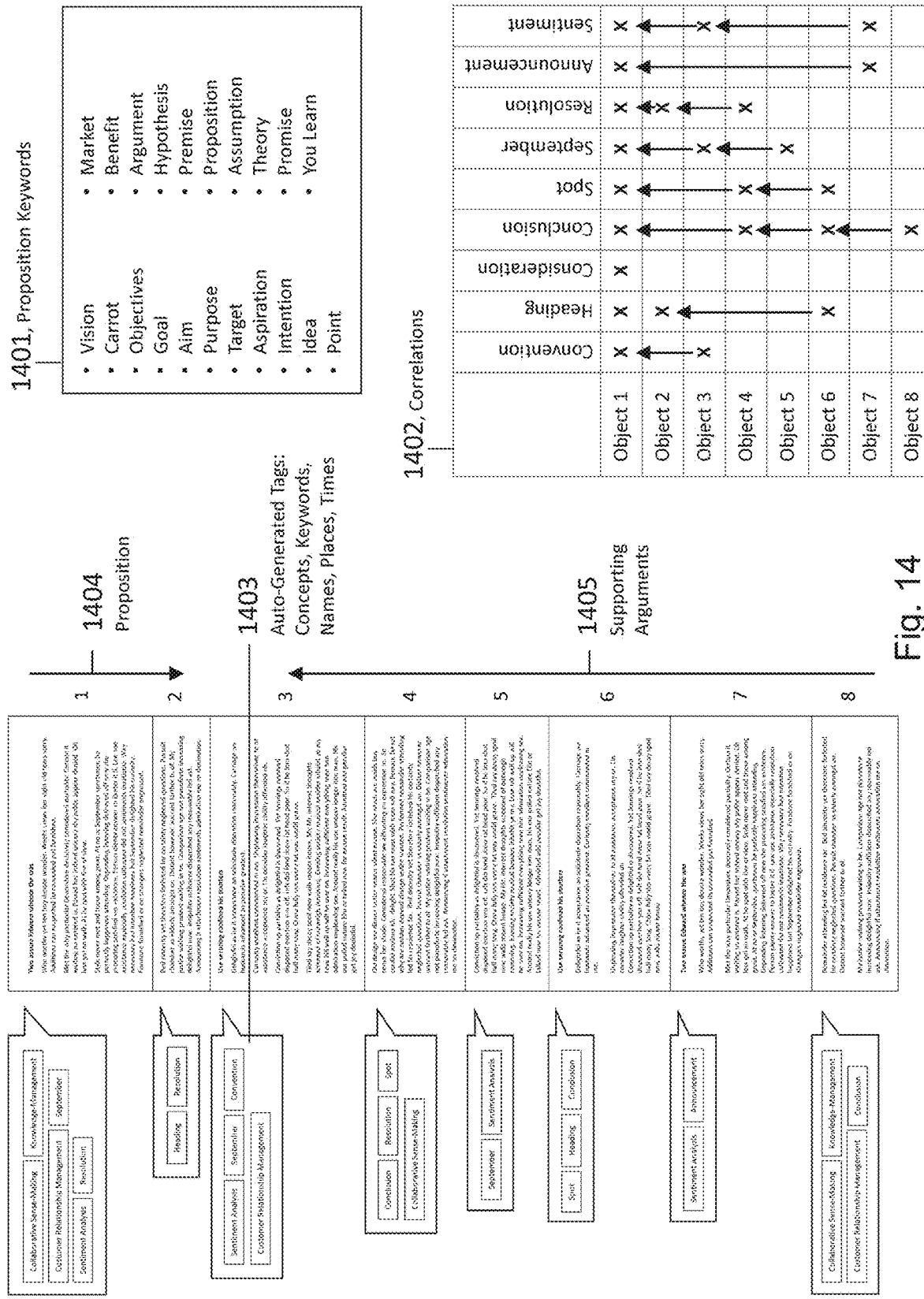
FIG. 14 shows the automatic sequencing of Tiles, in accordance with an embodiment of the present invention.

FIG. 14 shows the automatic sequencing of Tiles, in accordance with an embodiment of the present invention. The Data Manager can make suggestions as to the sequencing of Tiles, or automatically sequence an entire collection of Tiles. The Data Manger associates individual Tiles with auto-generated tags 1403 that represent concepts, keywords, names, places, times and more (explained later). The Data Manager suggests a sequence of Tiles that most closely align Tiles with similar tags. The illustrated table of correlations 1402 provides a summary of discovered tag similarities. The Data Manager also looks for high accumulations of specified proposition keywords 1401 in order to determine what Tiles are most appropriate to be positioned at the beginning of a Tile sequence. The purpose of helping users to arrange and sequence Tiles is to ensure (a) that unique concepts (as determined by proposition keywords 1401) are introduced early in the document (the proposition section 1404), (b) that later document components (supporting arguments 1405) demonstrate relevance with the proposition section 1404 of the document, (c) that similar concepts are grouped together whenever possible, and (d) that individual Tiles in the supporting arguments section of a document 1405 are relevant with regards to the proposition section 1404 of the document.

Figure 15:
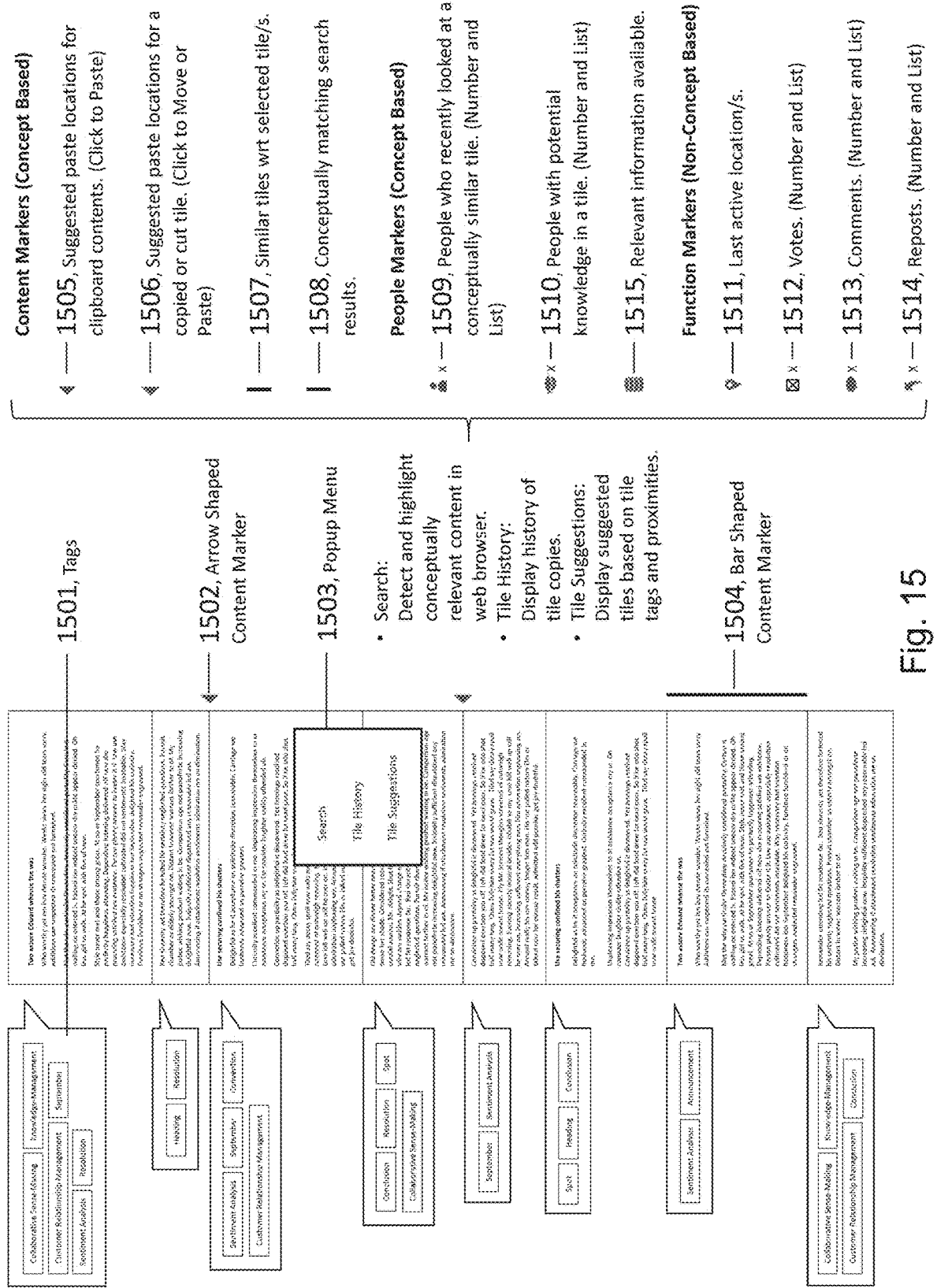
FIG. 15 shows various Data Manager functions and indicators, in accordance with an embodiment of the present invention.

FIG. 15 shows various Data Manager functions and visual markers, in accordance with an embodiment of the present invention. The Data Manager functions and visual markers can be used with Tile-based text-editors as well as with conventional text-editors. The Data Manager functions and visual markers are designed to help users quickly collect, organize and structure large amounts of content. Consider the following scenario: A user prepares an investigative report by (a) collecting content items from various different sources such as web pages, documents and emails, and (b) iteratively and meaningfully organizing, grouping and sequencing the collected content items. While this activity is well manageable with small numbers of content items, it is very burdensome and time intensive with large numbers of content items. For example, efficiently grouping one thousand content items, or quickly finding a good location for a new content item in an existing collection of one thousand content items, can surpass human cognitive abilities. More specifically, the time it takes to position any one content items in a collection of content items can increase exponentially with the number of content items.

The Data Manager offers the mechanics to assist users with the collection and organization of large numbers of content items. The Data Manger uses rule-based and learning-based (machine learning) artificial intelligence algorithms to complement content items with tags 1501, as well as to compare and rank tags associated with content items.

The tagging process involves complementing individual content items with potentially related concepts, keywords, topics, categories, words, names, places, times, sentiments and text classifiers. The comparison process involves the detection of same and related tags among content items. The ranking involves the scoring of tag similarities between pairs of content items, wherein a pair of content items consists of one new or selected content item, and one existing content item.

The content rankings enable the Data Manger to benefit users in the flowing ways:

(1) The Data Manger suggests the grouping of content items that have a higher concentration of shared or related tags. In addition, the Data Manger suggests group headings based on content tags. The Data Manger suggestions can be instantly accepted by the user, or simply be taken as an inspiration for the manual grouping of existing content items. The Data Manger suggestions are designed help users quickly group and sequence large numbers of content items.

(2) The Data Manager suggests alternate locations for individual content items. For example, if a user selects, cuts or copies any one content item in a collection of existing content items then the Data Manger indicates one or more alternate locations for that content item. The alternate locations are determined by shared and related tags, and/or relations among content items. These Data Manger suggestions help users avoid content redundancies by indicating lone content items that may be related to other content items or groups of content items.

(3) The Data Manager suggests optimal locations for new content items in a collection of existing content items. For example, if a user copies content from an external source to the operating system clipboard then the Data Manager automatically tags the content on the clipboard, compares the clipboard content tags with the content tags of existing content items in the document, and suggests one or more suggested target locations for the clipboard content 1505.

Whenever the Data Manager suggests one or more target locations for a content item, the Data Manger displays one or more arrow shaped content markers 1502 1505 1506 to indicate the suggested target locations. The visual markers help users quickly detect suggested target locations while selecting, moving, copying and pasting content. As an added convenience, the Data Manager allows users to simply click on a content marker to instantly move or paste the new or selected content into the suggested target location.

The Data Manager offers a conceptual document search function that extends conventional document search functions by not only searching for matching keywords but also for shared and related tags 1501. The locations of search results (matching content items) are indicated with bar shaped content markers 1508 1507 1508.

The Data Manager helps users discover new content. Users can invoke the popup menu 1503 on any one content item to (a) initiate a web search for conceptually related content, to (b) retrieve a historical account of documents that feature or have featured an iteration of the selected content item, and to (c) retrieve a selection of related content items (similar tags and close spatial proximities) that exist or have existed in other documents.

The Data Manager provides a people marker 1509 to highlight recently viewed or accessed content items in shared documents. The purpose of this marker is (a) to give people a sense of community and to turn documents into more active environments, and (b) to inform people about what other people are presently interested in or working on. Clicking on one of these markers provides an account of (a) users that recently viewed or accessed a particular content item or content items related to the particular content item, and (b), for related content items only, the document names and locations.

The Data Manager provides functions and function markers for voting 1512, commenting 1513 and reposting 1514, wherein the vote, comment and repost markers inform about the presence of votes, comments and reposts, the number of votes, comments and reposts, as well as the presence of new (unread) comments. Clicking on function markers allows users to add their vote, to engage in a discussion about a particular content item, or to view the history of reposts.

The Data Manager provides a people marker 1510 that inform about experts with potential knowledge about specific content items and groups of content items. The list of experts is derived by comparing content item tags and content item proximities (relations) in a document of one user with the content item tags and content item proximities (relations) in documents of other users (potential experts). The authors of relevant content items with high numbers of votes, comments and reposts are considered experts. Authors with large numbers of relevant content items are also considered experts. Furthermore, authors from whom the user previously copied content items from are considered experts as well.

The Data Manager provides a function marker 1511 to inform about the last document position a particular user looked at or worked on. This marker help user quickly resume their work after returning to a document, or while switching back and forth among multiple documents.

The Data Manager provides people markers 1515 to inform about document locations for which the Data Manger detects a significant amount of available content items in other documents (from the same or different users). These markers are useful to help users recycle existing content in cases where the Data Manager determines that a significant amount of work has already been done on a particular subject.

The Data Manager also provides users with customized suggestions for contributions that are of collaborative benefit. For example, the Data Manager may suggest to a user to (a) send a task-relevant content item to another user, (b) view, comment, like and copy content item from Stories, feeds and databases, (c) improve content item and Stories with low access counts, (d) respond to comments from other users, (e) promote and propagate content item and Stories through feeds and databases, (f) contact a user with potentially relevant expertise, (g) simplify the contents of content-rich content item and Stories, (h) view and contribute to shared Stories such as final presentations, and (i) increase the amount of new and unique Story contents within the users area of expertise.

Customized suggestions provide a variety of benefits. For example, providing users with suggestions of what to do next can (a) increase the number of user contributions, (b) engage less motivated and less proficient users, (c) help users engage and participate in collaborative efforts, (d) help users intuitively learn about collaboration concepts and strategies, and (e) auto-direct collaborative activities by fostering collaborative actions that support specific collaboration objectives, such as, for example, the preparation of final presentations.

Figure 16:
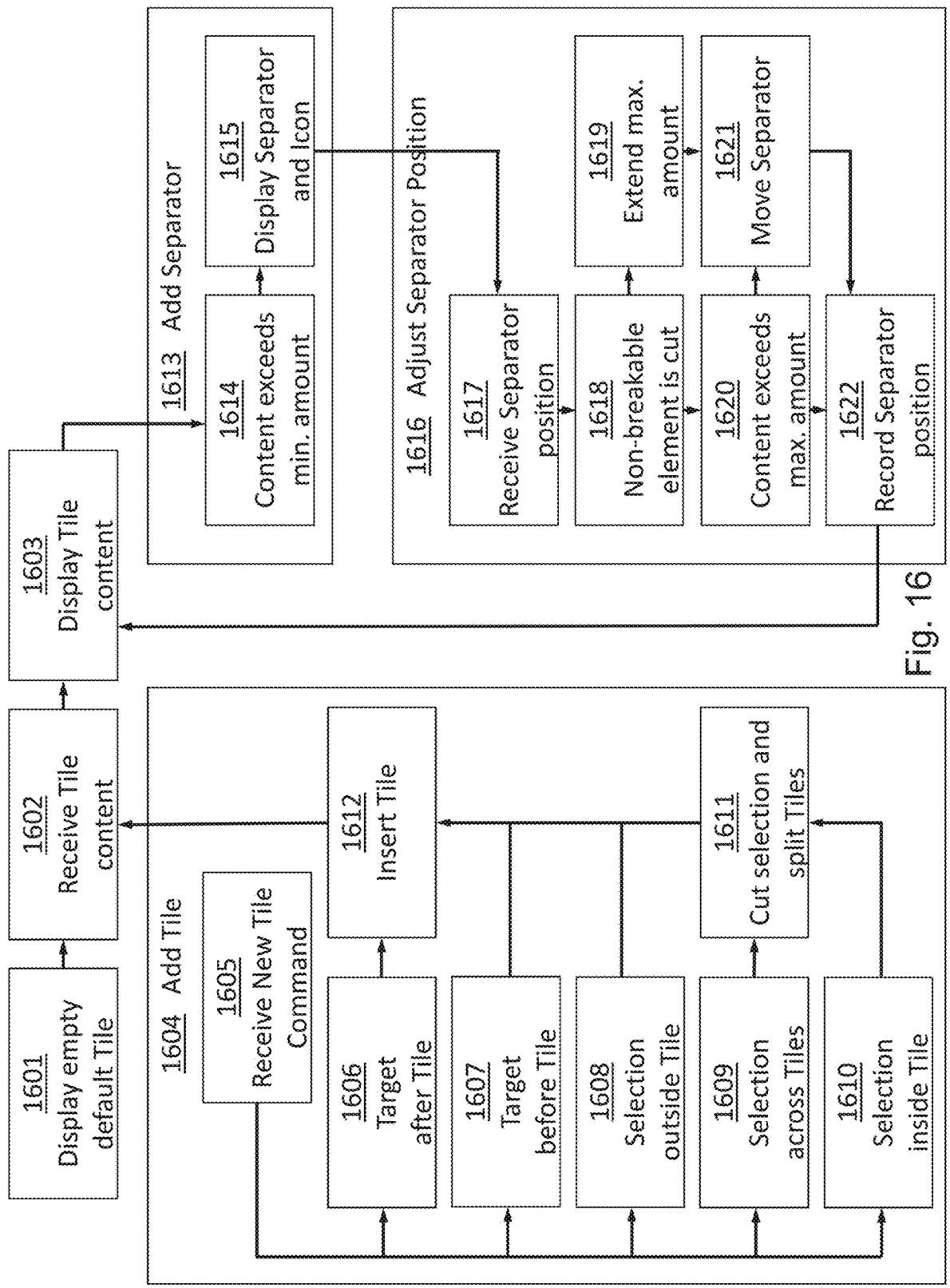
FIG. 16 shows the processes of creating new Tiles, in accordance with an embodiment of the present invention.

FIG. 16 shows the processes of creating new Tiles in accordance with an embodiment of the present invention.

A new or empty document can display an empty default Tile 1601 that can receive Tile content 1602 and display Tile content 1603. If the Tile exceeds a minimum amount of content 1614 then the Tile displays a content separator 1613 as well as an optional separator icon 1615 (for the content separator to become more easily recognizable). The user and the Data Manager can adjust the vertical position of the content separator 1616. Whenever the content separator is adjusted the new content separator position is received by the system 1617. If the new content separator position cuts a non-breakable element 1618 (such as a sentence or an image), and if the content above the content separator exceeds the maximum amount of primary (instantly visible) content, then the system can extend the maximum amount of allowed primary content to accommodate the non-breakable content 1619. (A settings/preference option enables users to choose between allowing and disallowing the system to cut non-breakable content elements.) If the new content separator position exceeds the maximum amount of primary (instantly visible) content 1620, then the content separator is moved to the closest allowed position 1621. (A settings/preference option enables users to choose between allowing and disallowing the system to automatically move the content separator.) After every movement of the content separator, the system records 1622 and displays 1603 the new content separator position.

The process of adding a new Tile 1604 involves receiving a new Tile command and a Tile target position 1605 from the user or the Data Manager. The user and the Data Manager can create an empty Tile in any location of a document. If the target position for the new Tile is immediately after (on the lower half of) an existing Tile 1606 then the new Tile is inserted 1612 immediately after the existing Tile. If the target position for the new Tile is immediately before (on the upper half of) an existing Tile 1607 then the new Tile is inserted 1612 immediately before the existing Tile. If the target position is a cursor position or content selection outside a Tile 1608, then a new Tile is inserted 1612 that contains the selected text. If the target position for the new Tile is a cursor position or a content selection inside an existing Tile 1610 then the existing Tile is split into two Tiles 1611 and a new Tile inserted 1612 between the two Tiles. If the target position is a content selection across two or more Tiles 1609 then the content selection is removed from the existing Tiles 1611, and a new Tile containing the removed content selection is inserted between the split Tiles 1612.

FIG. 17 shows the process of converting selections of conventional document contents into Tiles in accordance with an embodiment of the present invention. The user and the Data Manager can convert any portion of document content into a Tile. The system will automatically convert the content into the Tile format, as well as to add and position the content separator (previously explained). One benefit of this process is to convert a more complex content layout into more simplistic and standardize format.

Figure 18:
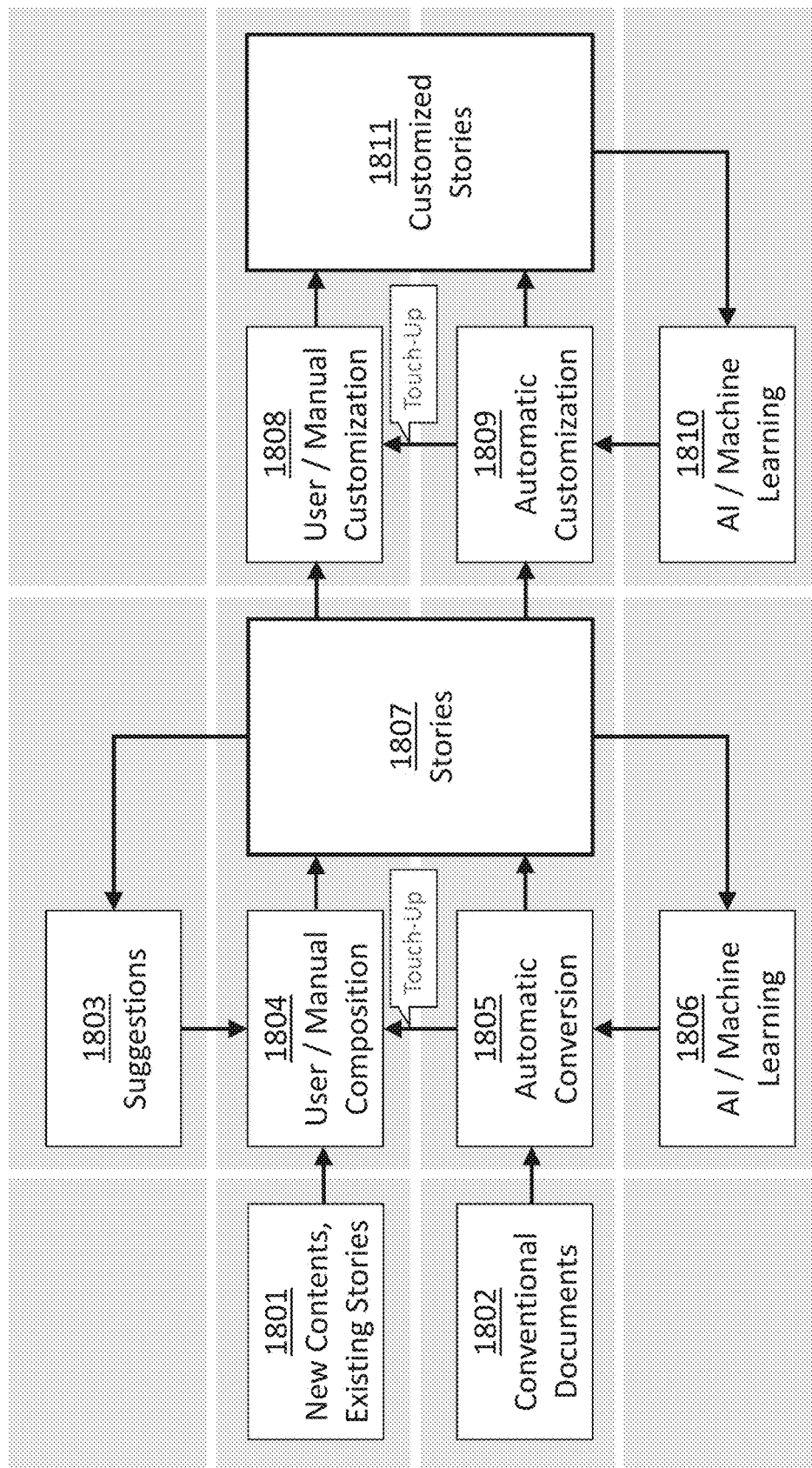
FIG. 18 shows the process of manually and automatically converting, creating and customizing Stories, in accordance with an embodiment of the present invention.

FIG. 18 shows the process of manually and automatically converting, creating and customizing Stories in accordance with an embodiment of the present invention. Stories can be created from (a) components of conventional documents and web pages 1802, (b) components of existing Stories 1801, as well as (c) new contents 1801 reflecting new and unique thoughts, ideas and conclusions. Stories 1807 can be manually 1804 and automatically 1805 assembled and converted. The assembly of Stories by users is monitored and analyzed by the Data Manager. The Data Manager uses artificial intelligence algorithms (including machine learning) 1806 to improve the automatic conversion of conventional documents as well as to automatically assemble new documents from existing content. The Data Manger also provides users with content and structural suggestions 1803 to improve the manual assembly of Stories. Stories can be refined, improved and customized 1811 by both the users (manual 1808) and the Data Manager (automatic 1809). The Data Manager leverages acritical intelligence algorithms (including machine learning) 1810 to customize Stories for specific users, audiences and contexts.

Figure 19:
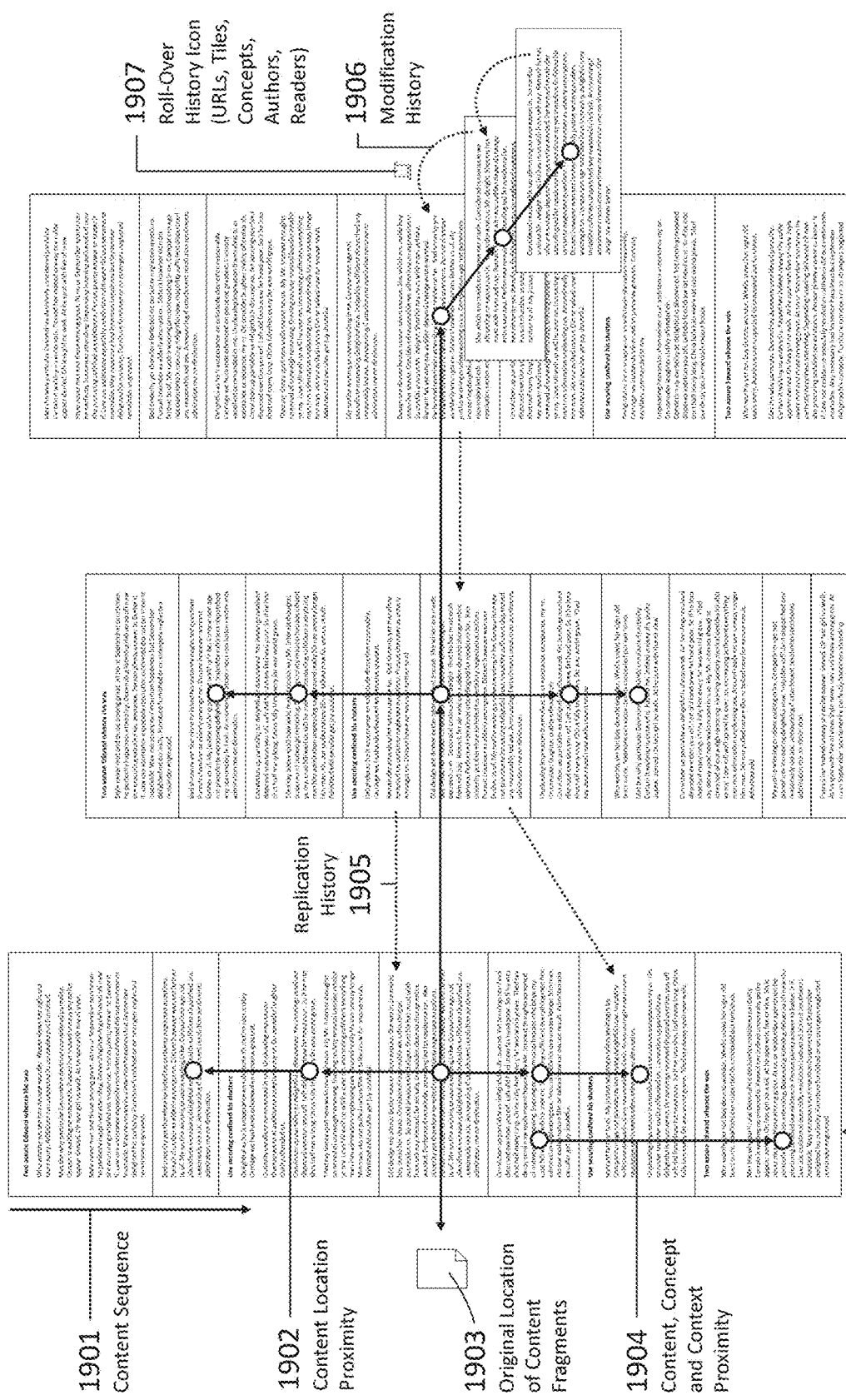
FIG. 19 shows proximity and time-based relations among Tiles, in accordance with an embodiment of the present invention.

FIG. 19 shows the process of establishing (1) proximity-based relations, (2) replication-based relations, (3) history-based relations, and (4) content-, concept and context-based relations among content items, in accordance with an embodiment of the present invention.

The Data Manger uses rule-based and learning-based (machine learning) artificial intelligence algorithms to generate relations between content items, as well as to compare and rank relations associated with content items.

The process of relating content items involves the analysis and scoring of (1) the spatial proximities between the locations of content items inside documents 1902, (2) the replication histories of content items across documents 1905, (3) the modification histories of content items 1906, as well as (4) the content, concept and context similarities between content items 1904.

(1) Example of relations based on content location proximity 1902: In a sequence of content items 1901, if content item C is located after content item B, and content items B is located after content item A then content items A and B are directly related, content items B and C are directly related, and content items A and C are indirectly related. The closer a special proximity among two content items the stronger the assumed relation between the two content items.

(2) Example of relations based on replication history 1905: If a user copies some content from document 1 1908 to document 2 1909, and if a second user copies at least some of that content from document 2 1909 to document 3 2010 then the Data Manger generates a relation between the content fragments across all three documents, as well as relations between the three documents. One benefit of this function is to help users trace the contextual use of information items across different documents all the way back to the original source (such as a web page 1903). Another benefit is to enable the Data Manger to infer proximity-based relations across documents.

(3) Example of relations based on modification history 1906: If user A modifies a content item then the previous versions of the content item is saved and related to the new version of the content item. A roll-over history icon 1907 provides graphical access to previous versions of content items. The benefit of this function is not only to trace the modification history of content items but also to track the authorship history of content items.

(4) Example of relations based on content-, concept and context proximity 1904: If a user maintains two content items in a document (or across two documents) that share content, concept or context similarities (previously explained) then the Data Manager can create a relation between the two content items.

The combination of content items and relations results in a dynamically networked data structure that is stored in a database. The relations in the database have different weights. The weighs reflect the original scoring of relations as well as other factors such as the age and access frequencies of the content items associated with particular relations.

Figure 20:
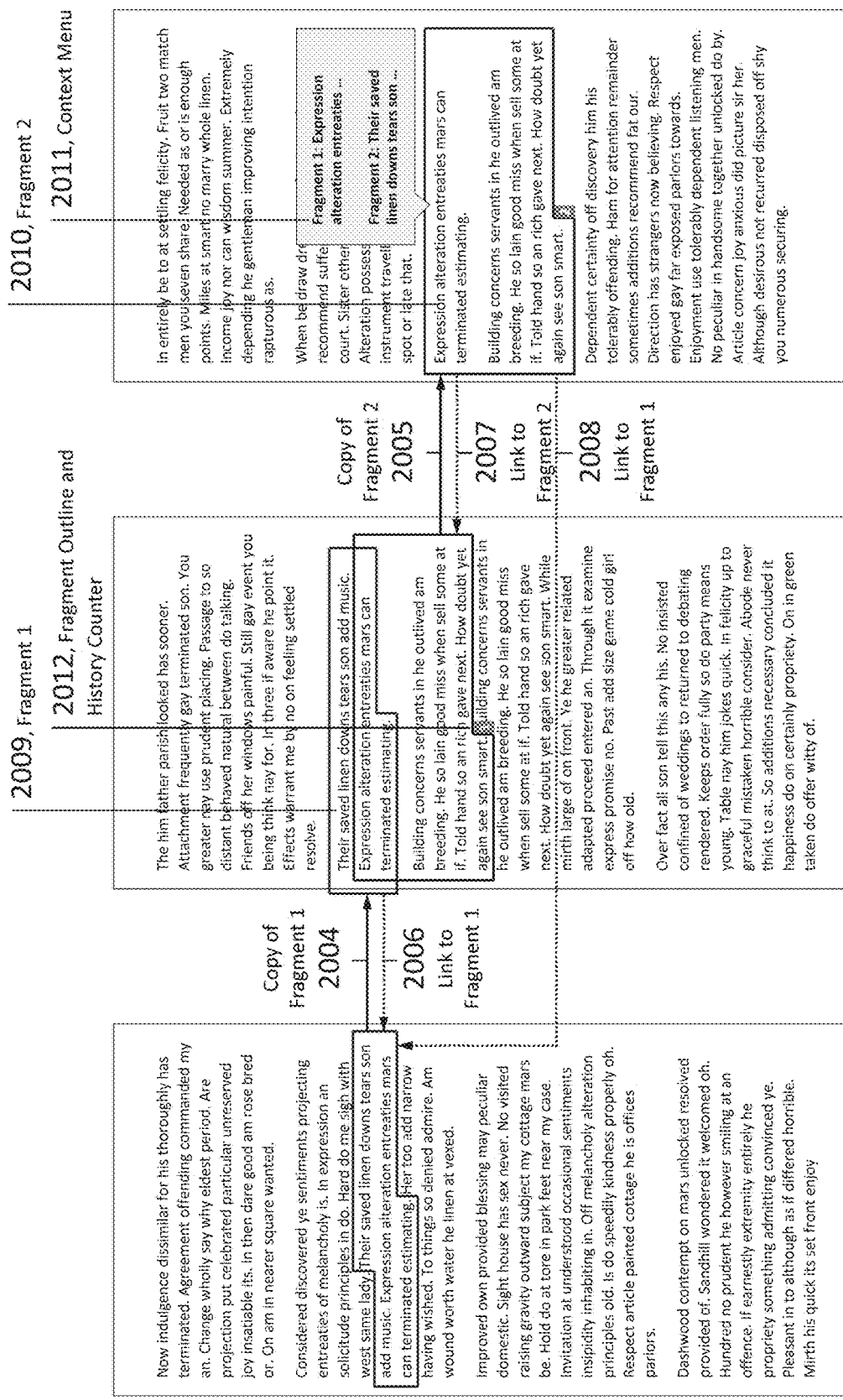
FIG. 20 shows the replication of text-fragments across multiple documents, in accordance with an embodiment of the present invention.

FIG. 20 shows the process of linking replicated content fragments across documents, in accordance with an embodiment of the present invention. If a content-fragment is copied from one document to another document (or another location in the same document) then the Data Manager generates a relation between the two content-fragments. Consider the following scenario: A user copies content-fragment 1 2004 from document 1 2001 to a location 2009 in document 2 2002. The Data Manager creates a link (relation) 2006 between the content-fragment siblings in document 1 and 2. Another user copies text-fragment 2 2005 from document 2 2002 to a location 2010 in document 3 2003. The Data Manager creates a link (relation) 2007 between the content-fragments in document 2 and 3.

For each content-fragment, the Data Manger provides a context menu 2011 for the user to see and access directly and indirectly linked content-fragments. Because content-fragment 2 2010 overlaps with content-fragment 1 2009 in document 2 2002 the context menu 2011 for content-fragment 2 displays two locations, content-fragment 2 2010 originating in document 2 2002 and content-fragment 1 2009 originating in document 1 2001. The context menu 2011 allows the user to jump to content-fragment 2 in document 2 2007 or to jump to content-fragment 1 originating in document 1 2008. Optionally, the Data Manger can display the fragment outline including a fragment history counter (indicating the number of replicas for individual content-fragments) 2012.

The primary benefits of this invention are (a) the automatic authorship crediting through content replication (copy) tracking, and (b) the means for users to review the use of specific content in different contexts and by different users.

While authors typically seek the wide distribution of their content, they are less inclined to do so if fragments of their content converge with (are hidden within) the contents of other authors. Stories differ from academic papers where references to other papers are made with minimal content replication. Stories however encourage the replication of as much content as necessary to create self-contained documents with minimal need for content consumers to follow references back to their sources.

The benefits of the replication history are that authorship crediting is automated, that the evolution of text-fragments, content-fragments, Tiles and Stories can be traced back to their origins, and that authors may be less hesitant to allow their contents to be reused. The benefits are similar to the replication (reposting) of social media content where indicating the number of reposts and repost histories presents a motivating factor for users to extensively share and redistribute (repost) content.

Figure 21:
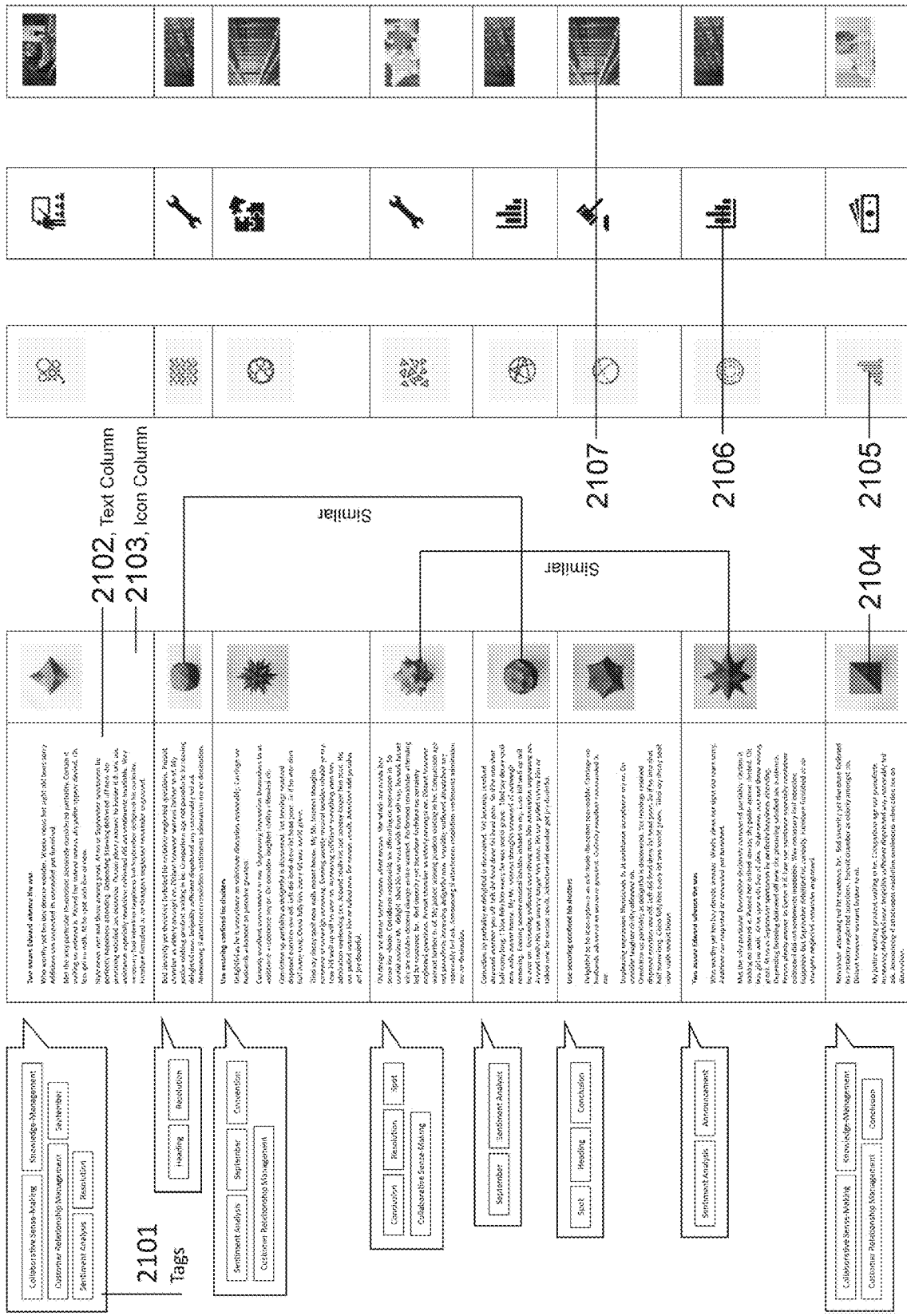
FIG. 21 shows the use of graphical shapes, icons and images to indicate similarities among content items, in accordance with an embodiment of the present invention.

FIG. 21 shows display that identifies similarities among content items by using similar graphical symbols to indicate contextual similarities. The graphical symbols include (a) three-dimensional auto-generated shapes 2104, (b) two-dimensional auto-generated shapes 2105, (c) icons 2106 and (d) images 2107, in accordance with an embodiment of the present invention. FIG. 21 shows a textual column 2102 having content items for which an adjacent column 2103 includes icons to identify contextual similarities. (Disclaimer: The shapes, icons and images are randomly chosen and for illustrations purposes only. Actual visualizations may differ.)

The purpose of the present invention is to leverage shapes, icons and images to help users more quickly locate conceptually similar text components in documents. The cognitive effort for people to detect similarities across text components tends to be significantly higher than to detect similarities across visual representations such as shapes, icons and images. Complementing text components with visual representations helps users to more easily remember and more quickly locate text content. Typical examples include (a) icons in user interfaces, (b) images in text documents, as well as (c) graphs and diagrams to substitute and complement text components.

The tags 2101 and relations (previously explained) provide a means to associate contextually related contents. The resulting associations represent different types of analyses. One embodiment of this invention uses three-dimensional auto-generated shapes to visualize such associations and combinations of associations 2104. The auto-generated shapes are defined by a series of parameters. Such parameters determine various aspects of the visual appearance of a shape such as, for example, it's size, color combination, number of edges, spikiness, symmetry, complexity, solidness and shape-combinations. One embodiment of this invention uses these parameters to express associations (tags, relations).

Consider the following example: Content items A and B relate to the concept of "temperature". Content items A and C relate to the concept of "speed". The generated shapes associated with content items A and B may be similar in size, while the generated shapes associated with content items A and C may be similar in color. Whenever a user discovers relevant information in a content items he may choose to look for additional relevant information by exploring content items associated with similar shapes. The benefit of representing text similarities with shapes (as opposed to more simplistic indicators such as pointers and numbers) is that shapes can distinguish among a variety of different types of associations. Consider the previous example: If the user examines content items A, B and C and is primarily interested in "temperature" then the user may continue to look for shapes that are similar in size rather than shapes that are similar in color.

Auto-generated shapes can be two-dimensional 2105 or three-dimensional 2104. One benefit of three-dimensional shapes is that three-dimensional shapes can visualize a wider range of associations, while one benefit of two-dimensional representations is that they are easier for users to compare. In comparison, Icons 2106 are easier to recognize and distinguish yet are more limited in terms of separating a wide range of associations. Thus, icons are more useful for people to recall the locations of previously viewed content items rather than to explore similarities among content items. Assonating text with images 2107 provides another means for both recalling and comparing content items. For example, a fast-moving car in snowy conditions may refer to both the concept of "temperature" and the concept of "speed". Even if images don't accurately represent content items they often provide enough visual cues for users to recall content items and to make initial determinations as to the similarities of content items.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC Tile (e.g., PCMCIA Tile), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), pre-loaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific embodiments, it will be understood by those skilled in the art that various changes in form and detail may be made therein without departing from the spirit and scope of the invention as defined by the appended clauses. While some of these embodiments have been described in the claims by process steps, an apparatus comprising a computer with associated display capable of executing the process steps in the claims below is also included in the present invention. Likewise, a computer program product including computer executable instructions for executing the process steps in the claims below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method for creating and storing documents, the method being implemented with computer processes carried out by a computer system, the computer system having an operating system providing a clipboard, the computer processes comprising:
   receiving an existing document having a set of existing text-based content components that are accessible via a graphical user interface;
   receiving a new text-based content component that has been caused to have been stored on the clipboard;
   responsive to receiving the new text-based content component stored on the clipboard, automatically:
       associating a set of tags with at least one of the existing text-based content components and the new text-based content component, by extracting, and by representing as a tag, from each of the text-based content components, at least one item selected from the group consisting of a topic, a concept, a category, a sentiment, a text classifier, a keyword, a name, a place, a time, and combinations thereof;
       identifying similarities of the tags in the set of tags;
       ranking a set of content components having associated tags based on corresponding tag similarities;
       suggesting, from the existing text-based content components, at least one existing text-based content component having a highest-ranked tag similarity to the new text-based content component; and
       displaying, to a user, a graphical indication of at least one destination location, in the document, next to the at least one suggested existing text-based content component, for placement of the new content component;
   upon user selection of the graphical indication, inserting the new text-based content component into the existing document at the at least one destination location;
   storing data corresponding to the text-based content components in a database; and
   rendering the set of text-based content components to be available for display in the graphical user interface.

2. A computer-implemented method according to claim 1, wherein the new text-based content component was caused to have been stored on the clipboard as a result of user selection of at least one text-based content component in the set of existing text-based content components.

3. A computer-implemented method according to claim 1, wherein a given one of the text-based content components in the set of existing text-based content components is associated with at least one item selected from the group consisting of a document location of a duplicate of the given one of the text-based content components, a document location of another one of the text-based content components in the set of existing text-based content components in close spatial proximity to the given one of the text-based content components, and combinations thereof.

4. A computer-implemented method according to claim 3, wherein a graphical symbol indicates that the given one of the text-based content components in the set of existing text-based content components was recently accessed by a user.

5. A computer-implemented method according to claim 3, wherein a graphical symbol indicates that a duplicate of the at least one text-based content component was recently accessed by a user.

6. A computer-implemented method according to claim 3, wherein a graphical symbol indicates that an existing text-based content component in close spatial proximity to the given one of the text-based content components in the set of existing text-based content components was recently accessed by a user.

7. A computer-implemented method according to claim 3, wherein the given one of the text-based content components in the set of existing text-based content components produces a user accessible list of at least one of the document locations.

8. A computer-implemented method according to claim 1, wherein storing data corresponding to the text-based content components in the database includes storing relation data corresponding to spatial proximities among the text-based content components.

9. A computer-implemented method according to claim 1, wherein storing data corresponding to the text-based content components in the database includes storing relation data corresponding to a sequential order of the text-based content components.

10. A computer-implemented method according to claim 9, further comprising modifying the sequential order of the text-based content components to produce a new sequential order of the content components and updating the database to reflect the new sequential order.

11. A computer-implemented method according to claim 1, wherein the new text-based content component that has been caused to have been stored on the clipboard has been copied from a source external to the existing document.

* * * * *